United States Patent
Fletcher

(10) Patent No.: US 10,367,866 B2
(45) Date of Patent: *Jul. 30, 2019

(54) SYSTEMS AND METHODS FOR AUTOMATION FALLBACK

(71) Applicant: Grass Valley Canada, Toronto (CA)

(72) Inventor: Ian Fletcher, Castle Donington (GB)

(73) Assignee: Grass Valley Canada, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,672

(22) Filed: Aug. 28, 2017

(65) Prior Publication Data

US 2017/0359397 A1    Dec. 14, 2017

Related U.S. Application Data

(63) Continuation of application No. 14/245,538, filed on Apr. 4, 2014, now Pat. No. 9,749,370.

(Continued)

(51) Int. Cl.
*H04L 29/06* (2006.01)
*H04N 21/231* (2011.01)
(Continued)

(52) U.S. Cl.
CPC ...... *H04L 65/4076* (2013.01); *H04L 65/1066* (2013.01); *H04N 21/222* (2013.01); *H04N 21/2221* (2013.01); *H04N 21/2225* (2013.01); *H04N 21/231* (2013.01); *H04N 21/2387* (2013.01); *H04N 21/2625* (2013.01); *H04N 21/26258* (2013.01)

(58) Field of Classification Search
CPC ............ H04L 65/4076; H04L 65/1066; H04L 21/222; H04L 21/2221; H04L 21/2225; H04L 21/231; H04L 21/2387; H04L 21/2625
See application file for complete search history.

(56) References Cited

U.S. PATENT DOCUMENTS

| | | |
|---|---|---|
| 5,442,389 A | 8/1995 | Blahut et al. |
| 5,758,085 A | 5/1998 | Kouoheris et al. |

(Continued)

FOREIGN PATENT DOCUMENTS

| | | |
|---|---|---|
| UY | 34567 A | 2/2013 |
| WO | WO-00/70799 | 11/2000 |

(Continued)

OTHER PUBLICATIONS

"Next-Generation Production and Transmission Solutions for Broadcast New Challenges in Broadcast", Jan. 1, 2010, XP055134522, Retrieved from the Internet: URL:http://www.ddn.com/pdfs/02_Omnibus_Solution_Brief.pdf [retrieved on Aug. 13, 2014] the whole document, 4 pages.

(Continued)

*Primary Examiner* — Viet D Vu
(74) *Attorney, Agent, or Firm* — Foley & Lardner LLP; Daniel Rose; Christopher J. McKenna

(57) ABSTRACT

The present disclosure is directed to a single card solid-state play out server for retrieving or receiving content from a network or cloud based storage, and playing content according to an automated playlist received from a media distribution and management system.

36 Claims, 27 Drawing Sheets

Related U.S. Application Data

(60) Provisional application No. 61/809,336, filed on Apr. 6, 2013.

(51) Int. Cl.
*H04N 21/2387* (2011.01)
*H04N 21/222* (2011.01)
*H04N 21/2225* (2011.01)
*H04N 21/262* (2011.01)

(56) References Cited

U.S. PATENT DOCUMENTS

| | | | |
|---|---|---|---|
| 5,892,535 A | 4/1999 | Allen et al. | |
| 7,203,952 B2 | 4/2007 | Broadus | |
| 9,002,991 B2 | 4/2015 | Fletcher | |
| 9,749,370 B2 | 8/2017 | Fletcher | |
| 2002/0032910 A1 | 3/2002 | Hayasaka et al. | |
| 2002/0188955 A1 | 12/2002 | Thompson et al. | |
| 2003/0100298 A1 | 5/2003 | Butler | |
| 2004/0073924 A1 | 4/2004 | Pendakur | |
| 2004/0244059 A1 | 12/2004 | Coman | |
| 2005/0022237 A1* | 1/2005 | Nomura | H04N 5/44543 725/39 |
| 2005/0159104 A1 | 7/2005 | Valley et al. | |
| 2007/0157251 A1 | 7/2007 | Shrivastava et al. | |
| 2007/0261090 A1 | 11/2007 | Miller et al. | |
| 2009/0037950 A1 | 2/2009 | Ching et al. | |
| 2009/0070799 A1 | 3/2009 | Jacobs | |
| 2010/0058405 A1 | 3/2010 | Ramakrishnan et al. | |
| 2010/0067437 A1 | 3/2010 | Vikberg et al. | |
| 2010/0083301 A1 | 4/2010 | Swenson | |
| 2010/0122305 A1 | 5/2010 | Moloney | |
| 2010/0149983 A1 | 6/2010 | Lee et al. | |
| 2010/0160792 A1* | 6/2010 | Furnish | A61B 5/0062 600/479 |
| 2010/0325666 A1* | 12/2010 | Wiser | H04N 7/17336 725/44 |
| 2011/0099584 A1* | 4/2011 | Rodriguez | G06F 17/30864 725/51 |
| 2011/0107372 A1* | 5/2011 | Walter | H04N 21/26283 725/39 |
| 2012/0297431 A1 | 11/2012 | Wang | |
| 2013/0198792 A1 | 8/2013 | Wright et al. | |
| 2013/0316640 A1 | 11/2013 | Jellison et al. | |

FOREIGN PATENT DOCUMENTS

| | | |
|---|---|---|
| WO | WO-2004/102844 A2 | 11/2004 |
| WO | WO-2009/116091 A2 | 9/2009 |

OTHER PUBLICATIONS

Deloddere et al., "Interactive video on demand," IEEE Communications Magazine, IEEE Service Center, vol. 32, No. 5, May 1, 1994.
EMC: "EMC Isilon Clustered Storage and Miranda ITX the Challenge of Unprecedented Digital Content Growth Powerful Next-Generation Solutions", Jan. 1, 2013, XP055134514, Retrieved from the Internet: URL:http://www.emc.com/collateral/hardware/solution-overview/h10543-so-isilon-and-miranda-itx.pdf [retrieved on Aug. 13, 2014] the whole document, 3 pages.
European Search report for EP 16170859.9 dated Sep. 6, 2017.
Extended European Search Report for EP 16170859.9 dated Aug. 12, 2016.
Extended European Search Report for EP 16170861.5 dated Aug. 24, 2016.
Extended European Search Report for EP 16170861.5 dated Nov. 17, 2017.
Final Office Action on U.S. Appl. No. 14/245,538 dated Jan. 25, 2017.
Final Office Action on U.S. Appl. No. 14/245,549 dated Jan. 10, 2017.
International Preliminary Report on Patentability for Application No. PCT/IB2014/001277 dated Oct. 15, 2015.
International Search Report and Written Opinion for International Patent Application No. PCT/IB2014/001277 dated Aug. 27, 2014.
Notice of Allowance on U.S. Appl. No. 14/245,538 dated Apr. 27, 2017.
Office Action for U.S. Appl. No. 14/245,519 dated Aug. 25, 2014.
Office Action for CN 2014800201403 dated Feb. 24, 2018.
Office Action on U.S. Appl. No. 14/245,549 dated Sep. 27, 2017.
Office Action on U.S. Appl. No. 14/245,538 dated Sep. 28, 2016.
Search Report for EP 16170861.5 dated Jul. 17, 2018.
U.S. Notice of Allowance for U.S. Appl. No. 14/245,519 dated Dec. 9, 2014.
U.S. Office Action on U.S. Appl. No. 14/245,549 dated Jul. 1, 2016.

* cited by examiner

News controls 610

| Version | Release Date |
|---|---|
| 0.8 | 1/15/13 2:12:12 PM |
| 0.7 | 1/3/13 1:58:02 PM |

| Type | Change |
|---|---|
| Bug | Schedule pickup on hardware restart |
| Feature | Timezone Offsets |

Description 616

Timezone Offsets

You can now set a channel timezone offset which controls how the start times are displayed in the schedule grid.

The tiresome offset is defined in the channel configuration channel types menu and will affect all channels in that type. You can define the offset in any timecode value and whether it is positive or negative from UTC....

Version History 614

*FIG. 6D*

Channels          Total:53

| All Channels | Channel Mapping |

| Name | Location | Device | IP Address |
|---|---|---|---|
| *Contains...* | *Contains...* | *Contains...* | *Contains...* |
| City-1A | City 1 | City1-Card1 | 1.2.3.4 |
| City-1B | City 1 | City1-Card2 | 1.2.3.4 |
| City-2A | City 2 | City2-Card1 | 5.6.7.8 |
| City-2B | City 2 | City2-Card2 | 5.6.7.8 |

Task bar 606

| Edit Schedule | Append Schedule | Empty Schedule | Show History |

← Channel Selection 618

*FIG. 6E*

City-1A

Channel Logo

On | Off

Number of items: 4

On Air
Program

Next
Program

Elapsed Time
00:07:03

Count To
00:02:59

| Date | Time | Type | Transition | Name | Title | Duration | Status |
|---|---|---|---|---|---|---|---|
| Contains... | Contains... | Contains... | Contains... | Contains... | Contains... | Contains... | Contains... |
| 1/29/13 | 11:56:40.07 | Clip | cut | Program | Segment2 | 00:10:03.00 | On Air |
| 1/29/13 | 12:06:43.07 | Clip | vfade | Bumper | Station Ad | 00:01:54.00 | Cued |
| 1/29/13 | 12:08:37.07 | Clip | cutfade | Promo | New Show | 00:02:30.00 | Ready |
| 1/29/13 | 12:11:07.07 | Clip | fadecut | Promo | Coming Up | 00:14:20.00 | Ready |
|  |  |  |  |  |  |  |  |

Task bar 606

[ Bypass ] [ Return ] [ Cue Next ] [ TAKE NEXT ] [ Hold Next ] [ Drop Next ] [ Control Channel ]

Schedule Screen 620

*FIG. 6F*

| Item Details |
|---|

Event GUID

Event ID

Event Title

Time

Auto / Follow On ▽

Date

| Today | Jan 29, 2014 ▽ |

Time

12:29:24:04

Media

| In Point | Out Point | Duration |
|---|---|---|
| 00:00:00:00 | 00:02:25:00 | 00:02:25:00 |

Transition

| Cut | Mix | V | C.F. | F.C. |

Transition Duration

00:00:00:00

↙
Schedule Edit Screen 622

*FIG. 6G*

Assets

| Name | Title |
|---|---|
| Contains... | Contains... |
| Test Clip | Test |
| 1HR_BITC_720p5994 | 1 Hour BITC 720p 59.94 |
| 1HR_BITC_720p5994_P1 | |
|  | |
| | |
| | |
| | |
| | |
| | |
| | |
| | |
| | |

[New Asset]  [Delete Asset]

Asset management selection 624

| FIG. 6H | FIG. 6I | FIG. 6J |
|---|---|---|

Asset detail editing 626

| FIG. 6H | FIG. 6I | FIG. 6J |
| --- | --- | --- |
| | | |

Asset usage 628

System Administration
Screen 632

User Administration Screen
634

*FIG. 6N*

System log view 636

Missing material view 638

SYSTEMS AND METHODS FOR AUTOMATION FALLBACK

RELATED APPLICATIONS

The present application claims the benefit of and priority as a continuation to U.S. Nonprovisional patent application Ser. No. 14/245,538, entitled "Systems and Methods for a Media Play Out Card," filed Apr. 4, 2014, and issued as U.S. Pat. No. 9,749,370 on Aug. 29, 2017; which claims priority to U.S. Provisional Patent Application Ser. No. 61/809,336, titled "Systems and Methods for Media Distribution and Management," filed Apr. 6, 2013, the entirety of each of which are hereby incorporated by reference.

FIELD

The present application relates to systems and methods for cloud based media distribution, automation, and management. In one aspect, the present application is directed to a media playout card for use in broadcasting networks.

BACKGROUND

Satellite-based media distribution provides high bandwidth and low transmission cost to a wide geographic area. Additional downlink sites can be added for a low marginal cost, at no increased uplink expense, providing a highly scalable media delivery system. For years, such systems have allowed television and radio networks to utilize centralized studios for origination and production of media with regional network affiliates or downlink sites with local terrestrial transmitters to reach large populations.

However, such downlink sites are typically either simple downlink and retransmission stations with little to no ability to add local or regional programming, or are complex (and significantly more expensive) local affiliates manned with live operators who perform manual switching of network feeds and local programming. In a hybrid model, automation systems can provide switching and playback of locally stored content, such as local advertising, but may still require a local engineer for programming and maintenance. Additionally, such local content typically needs to be added locally, and may require local production studios or editing environments, at increased cost.

In one aspect, the present disclosure is directed to a method for generating a hierarchical media automation schedule. The method includes associating, via a server device, each of a plurality of devices with a broadcast region, each broadcast region corresponding to a node in a hierarchical tree for broadcasting to the plurality of regions. The method also includes generating, via the server device, a first schedule for a parent node in the hierarchical tree. The method also includes generating, via the server device, a second schedule for a child node in the hierarchical tree; and aggregating the first schedule and second schedule to generate an aggregated set of automation instructions.

In some embodiments, the method includes transmitting, by the server device, the first schedule and second schedule to a first device of the plurality of devices; and aggregating, by the first device of the plurality of devices, the first schedule and second schedule. In a further embodiment, the method includes determining, by the first device, that it is in a broadcast region corresponding to the child node in the hierarchical tree; and aggregating the first schedule and second schedule responsive to the determination. In one embodiment, the method includes aggregating, by the server device, the first schedule and second schedules; and transmitting, by the server device, the aggregated set of automation instructions to a first device of the plurality of devices. In some embodiments, the method includes transmitting at least one item of content to one or more of the plurality of devices for playback in accordance with the aggregated set of automation instructions.

In another aspect, the present disclosure is directed to a method for propagating edits in a hierarchical media automation system. The method includes receiving, by a device, a request to edit a schedule in a media automation system, the request identifying a first node in a hierarchical tree corresponding to a broadcast region. The method also includes retrieving, by the device, a media automation schedule corresponding to the identified first node. The method further includes editing, by the device, the retrieved media automation schedule according to the received request. The method also includes identifying, by the device, a second node having a child relationship to the identified first node. The method further includes retrieving, by the device, a second media automation schedule corresponding to the identified second node; and editing, by the device, the second media automation schedule according to the received request.

In one implementation, the method includes repeating the steps of identifying a node having a relationship to a previously identified node; retrieving a media automation schedule for the newly identified node; and editing the retrieved media automation schedule for the newly identified node, for each node having the child relationship to the first node, the second node, or a third node identified during an iteration of the method. In some implementations of the method, the request identifies an entry to add to a media automation schedule. In other implementations of the method, the request identifies an entry to delete from a media automation schedule. In still other implementations of the method, the edit request identifies a first entry to replace in a media automation schedule with a second entry. In a further implementation, the method includes determining if the second media automation schedule includes the first entry. In a still further implementation, the method includes replacing the first entry in the second media automation schedule with the second entry, responsive to determining that the second media automation schedule includes the first entry. In another further implementation, the method includes determining that the second media automation schedule does not include the first entry; and not replacing a third entry in the second media automation schedule with the second entry.

In some implementations, the method includes receiving, by the device, a request to add a node to the hierarchical tree corresponding to a second broadcast region, the request identifying a parent node; and editing, by the device, the hierarchical tree to add a new node as a child of the identified parent node. In a further implementation, the method includes generating, by the device, a third media automation schedule for the new node corresponding to the media automation schedule of the identified parent node.

In still another aspect, the present disclosure is directed to a system for generating a hierarchical media automation schedule. The system includes a server device comprising a processor and a storage device, the processor executing a media automation schedule manager. The media automation schedule manager is configured to associate each of a plurality of devices with a broadcast region, each broadcast region corresponding to a node in a hierarchical tree retained in the storage device for broadcasting to the plurality of regions. The schedule manager is further configured to generate a first schedule for a parent node in the hierarchical tree, and generate a second schedule for a child node in the hierarchical tree, the first schedule and second schedule aggregated to generate an aggregated set of automation instructions.

In some implementations, the media automation schedule manager is further configured to transmit the first schedule and second schedule to a first device of the plurality of devices, the first device comprising a second processor configured to aggregate the first schedule and second schedule. In a further implementation, the second processor is further configured to determine that the first device is in a broadcast region corresponding to the child node in the hierarchical tree, and aggregate the first schedule and second schedule responsive to the determination.

In another implementation, the media automation schedule manager is further configured to transmit the aggregated set of automation instructions to a first device of the plurality of devices. In still another implementation, the media automation schedule manager is further configured to transmit at least one item of content stored in the storage device to one or more of the plurality of devices for playback in accordance with the aggregated set of automation instructions.

In another aspect, the present disclosure is directed to a system for propagating edits in a hierarchical media automation system. The system includes a device comprising a processor and a storage device, the processor executing a media automation schedule manager. The media automation schedule manager is configured to receive a request to edit a schedule in a media automation system, the request identifying a first node in a hierarchical tree retained in the storage device corresponding to a broadcast region; and retrieve, from the storage device, a media automation schedule corresponding to the identified first node. The media automation schedule manager is also configured to edit the retrieved media automation schedule according to the received request; identify a second node having a child relationship to the identified first node; retrieve, from the storage device, a second media automation schedule corresponding to the identified second node; and edit the second media automation schedule according to the received request.

In some implementations, the media automation schedule manager is further configured to repeat the steps of identifying a node having a relationship to a previously identified node; retrieving a media automation schedule for the newly identified node; and editing the retrieved media automation schedule for the newly identified node, for each node having a child relationship to the first node, the second node, or a third node identified during an iteration. In some embodiments of the system, the request identifies an entry to add to a media automation schedule. In other embodiments of the system, the request identifies an entry to delete from a media automation schedule. In still other embodiments of the system, the request identifies a first entry to replace in a media automation schedule with a second entry.

In one embodiment, the media automation schedule manager is further configured to determine if the second media automation schedule includes the first entry. In a further embodiment, the media automation schedule manager is further configured to replace the first entry in the second media automation schedule with the second entry, responsive to determining that the second media automation schedule includes the first entry. In another further embodiment, the media automation schedule manager is further configured to determine that the second media automation schedule does not include the first entry; and not replace a third entry in the second media automation schedule with the second entry. In another embodiment, the media automation schedule manager is further configured to receive a request to add a node to the hierarchical tree corresponding to a second broadcast region, the request identifying a parent node; and edit the hierarchical tree to add a new node as a child of the identified parent node. In a further embodiment, the media automation schedule manager is further configured to generate a third media automation schedule for the new node corresponding to the media automation schedule of the identified parent node.

In still another aspect, the present disclosure is directed to a media play out system. The media play out system includes a first device, including a first processor and a first storage device, the first processor configured to transmit a hierarchical broadcast media automation schedule from the storage device to a second device via a network. The media play out system also includes the second device, including a second processor, a media router, and at least one media output interface connected to the media router, the second processor configured for receiving the hierarchical automation schedule from the first device, and identifying a node within the hierarchy corresponding to the second device. The second processor is also configured for aggregating media automation instructions of the identified node and each parent node of the identified node from the hierarchical automation schedule, and controlling the media router in accordance with the aggregated automation instructions.

In some embodiments, the second device further includes a second storage device, and the second processor is further configured for retrieving at least one item of content identified in the aggregated automation instructions, and playing the retrieved at least one item of content via the media output interface, in accordance with the aggregated automation instructions. In a further embodiment, the second processor is further configured for storing the retrieved at least one item of content in the second storage device; and playing the retrieved at least one item of content from the second storage device. In a still further embodiment, the second processor is further configured for determining whether a first item of content is available for playback at a first time designated for playback of the first item of content in the aggregated automation instructions. In a yet still further embodiment, the second processor is further configured for identifying a child node of the hierarchical automation schedule including the instruction designating playback of the first item of content at the first time, responsive to a determination that the first item of content is not available for playback; iteratively searching for a parent node of the child node including an instruction designating playback of a second item of content at the first time; and playing the second item of content in the second storage device via the media output interface, responsive to locating the parent node.

In some embodiments, the second processor is further configured for controlling the media router to switch among a plurality of media sources according to the aggregated automation instructions. In other embodiments, the second processor is further configured for identifying a node within the hierarchy responsive to the identified node corresponding to a broadcast region including the second device. In a further embodiment, the second processor is further configured for identifying a lowest tier node within the hierarchy corresponding to the broadcast region including the second device.

In one embodiment of the media play out system, aggregating automation instructions of the identified node and each parent node includes replacing an automation instruction of a first node with a corresponding automation instruction from a second node, the second node a child of the first node. In another embodiment, the second processor is further configured for transmitting a log of executed automation instructions to the first device.

In still another aspect, the present disclosure is directed to a method for cloud-based media play out. The method includes transmitting, by a first device to a second device via a network, a hierarchical media automation schedule stored in a storage device of the first device. The method also includes receiving, by the second device from the first device, the hierarchical media automation schedule. The method further includes identifying, by the second device, a node within the hierarchy corresponding to the second device. The method also includes aggregating, by the second device, media automation instructions of the identified node and each parent node of the identified node from the hierarchical media automation schedule; and controlling, by the second device, a media router of the second device in accordance with the aggregated media automation instructions.

In some embodiments, the method includes retrieving, by the second device, at least one item of content identified in the aggregated media automation instructions; and playing, by the second device, the retrieved at least one item of content via the media output interface, in accordance with the aggregated media automation instructions. In a further embodiment, the method includes storing the retrieved at least one item of content in the second storage device; and playing the retrieved at least one item of content from the second storage device. In a still further embodiment, the method includes determining, by the second device, whether a first item of content is available for playback at a first time designated for playback of the first item of content in the aggregated media automation instructions. In a yet still further embodiment, the method includes identifying, by the second device, a child node of the hierarchical media automation schedule including the instruction designating playback of the first item of content at the first time, responsive to a determination that the first item of content is not available for playback; iteratively searching, by the second device, for a parent node of the child node including an instruction designating playback of a second item of content at the first time; and playing the second item of content via the media output interface, responsive to locating the parent node.

In some embodiments, the method includes controlling, by the second device, the media router to switch among a plurality of media sources according to the aggregated media automation instructions. In other embodiments, the method includes identifying a node within the hierarchy responsive to the identified node corresponding to a broadcast region including the second device. In a further embodiment, the method includes identifying a lowest tier node within the hierarchy corresponding to the broadcast region including the second device. In another embodiment, the method includes replacing a media automation instruction of a first node with a corresponding media automation instruction from a second node, the second node a child of the first node. In a further embodiment, the method includes transmitting, by the second device, a log of executed media automation instructions to the first device.

In still another aspect, the present disclosure is directed to a media play out system, including a single card including a processor; at least one network interface; a storage device storing one or more items of content received via the at least one network interface; at least one content decoder connected to the storage device; at least one media input interface; at least one media output interface; and a mixer connected to the at least one content decoder, the at least one media input interface, and the at least one media output interface. The processor is configured to retrieve a media automation schedule from a second device via the network interface, and control the mixer to play out media in accordance with the retrieved media automation schedule.

In one embodiment, the mixer includes a video mixer; and the single card further includes an audio/video multiplexer connected between the at least one media output interface and the video mixer. In a further embodiment, the single card further includes an audio mixer connected to the audio/video multiplexer, the at least one media input interface, and the at least one content decoder. In some embodiments, the single card further comprises a bypass relay connected to the at least one media input interface and the at least one media output interface. In other embodiments, the media play out system further includes a device comprising a power supply and a card interface connected to the single card, the power supply providing power via the card interface to the single card. In a further embodiment, the device further comprises a second card interface; and the media play out system further includes a second single card connected to the second card interface.

In some embodiments, the single card is configured to play out media for a first broadcast region of a plurality of broadcast regions. In a further embodiment, the automation schedule is a hierarchical media automation schedule for the plurality of broadcast regions, and the processor is further configured for identifying a node within the hierarchy corresponding to the first broadcast region. In a still further embodiment, the processor is further configured for aggregating media automation instructions of the identified node and each parent node of the identified node from the hierarchical media automation schedule. In a yet still further embodiment, the processor is further configured for controlling the mixer in accordance with the aggregated media automation instructions. In an even still further embodiment, the processor is further configured for playing at least one of the one or more items of content stored in the storage device, in accordance with the aggregated media automation instructions. In another even still further embodiment, the processor is further configured for determining whether a first item of content identified in the aggregated media automation instructions for play back at a first time is available. In a still further embodiment, the processor is further configured for identifying a node of the hierarchical media automation schedule including the instruction designating playback of the first item of content at the first time, responsive to determining that the first item of content is not available; iteratively searching for a parent node of the child node including an instruction designating playback of a second item of content at the first time; and controlling the mixer to play the second item of content in the storage device via the media output interface.

In another embodiment, the single card further includes a monitoring encoder connected to the media output interface; and the processor is further configured to transmit the monitoring encoder output via the network interface.

In still yet another aspect, the present disclosure is directed to a method for broadcasting media to a region. The method includes retrieving a media automation schedule, by a media play out system comprising a single card comprising a processor, at least one network interface, a storage device storing one or more items of content received via the at least one network interface, at least one content decoder connected to the storage device, at least one media input interface, at least one media output interface, and a mixer connected to the at least one content decoder, the at least one media input interface, and the at least one media output interface; and controlling the mixer, by the processor, to play out media in accordance with the retrieved automation schedule. The media automation schedule is retrieved from a second device via the network interface.

In some embodiments, the media automation schedule is a hierarchical media automation schedule for a plurality of broadcast regions. In such embodiments, the method further includes identifying a node within the hierarchy corresponding to a first broadcast region including the media play out system. In a further embodiment, the method includes aggregating, by the processor, media automation instructions of the identified node and each parent node of the identified node from the hierarchical media automation schedule. In a still further embodiment, the method includes controlling, by the processor, the mixer in accordance with the aggregated media automation instructions. In a yet still further embodiment, the method includes playing, by the processor, at least one of the one or more items of content stored in the storage device, in accordance with the aggregated media automation instructions. In a still yet further embodiment, the method includes determining, by the processor, whether a first item of content identified in the aggregated media automation instructions for play back at a first time is available; and identifying, by the processor, a node of the hierarchical media automation schedule including the instruction designating playback of the first item of content at the first time, responsive to determining that the first item of content is not available. The method also includes iteratively searching, by the processor, for a parent node of the child node including an instruction designating playback of a second item of content at the first time; and controlling, by the processor, the mixer to play the second item of content in the storage device via the media output interface.

SUMMARY

The present disclosure describes systems and methods for cloud based media distribution, automation, and management, providing multi-tenancy automation hosting on a global scale. By moving all the complex business logic and management systems into the cloud with programming entered and maintained at a centralized location, the costs and complexity of deploying channels may drastically reduced and the complexity of the play-out devices can be reduced. Play-out devices may also include monitoring and network-based remote playback abilities for maintenance and administration. Accordingly, the cloud based automation platform may provide a highly resilient and scalable media distribution and automation system with increased flexibility over traditional downlinks and switchers.

In one aspect, the present disclosure is directed to a cloud-based media distribution and management system, providing pushing of content to regional playout servers geographically dispersed for local rebroadcasting of network based content. Automation may be controlled through a hierarchical system, allowing easy and efficient playlist editing and media control. In another aspect, the present disclosure is directed to a playout server for retrieving or receiving content from a network or cloud based storage, and playing content according to an automated playlist received from a media distribution and management system.

BRIEF DESCRIPTION OF THE FIGURES

In the drawings, like reference numbers generally indicate identical, functionally similar, and/or structurally similar elements.

DETAILED DESCRIPTION

The following description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

The present disclosure describes systems and methods for cloud based media distribution, automation, and management, providing multi-tenancy automation hosting on a global scale. By moving all the complex business logic and management systems into the cloud with programming entered and maintained at a centralized location, the costs and complexity of deploying channels may drastically reduced and the complexity of the playout devices can be reduced. Such playout devices may include servers, workstations, desktop machines, or modular systems, such as blade servers, or chassis or frame mounted systems on cards, such as the iTX platform or Miranda edge playout devices manufactured by Miranda Technologies of Montreal, Canada.

Figure 1A:
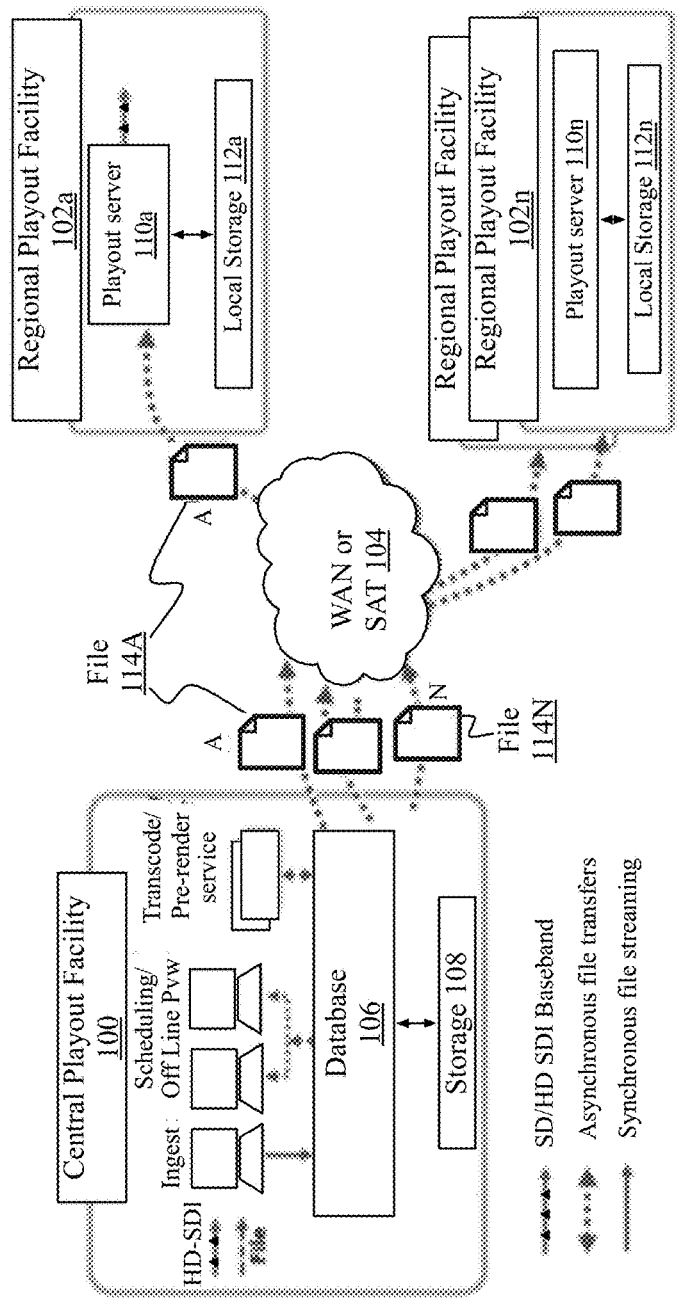
FIGS. 1A-1C are block diagrams of embodiments of content delivery in various implementations of regional networks, illustrating local playout server storage, shared playout server storage, and virtual network affiliate configurations, respectively.
Figure 1B:
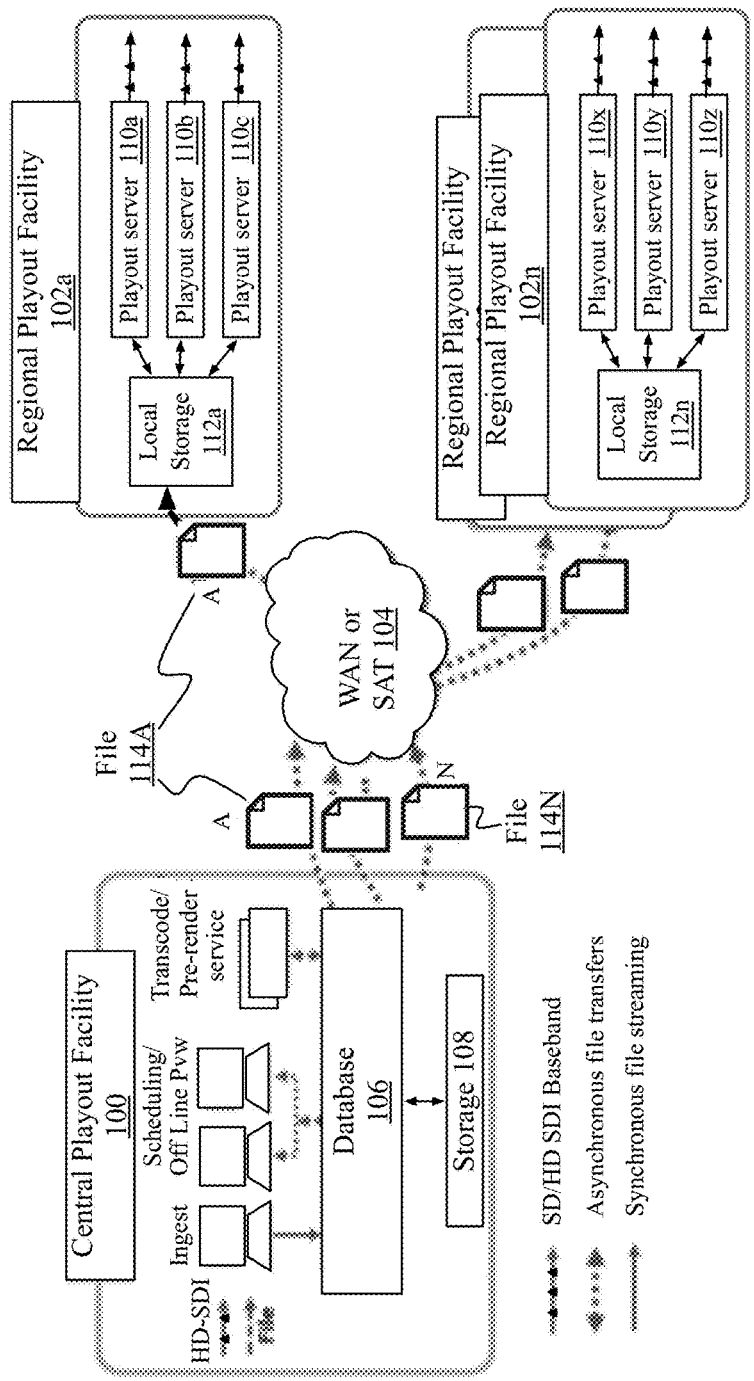
Figure 1C:
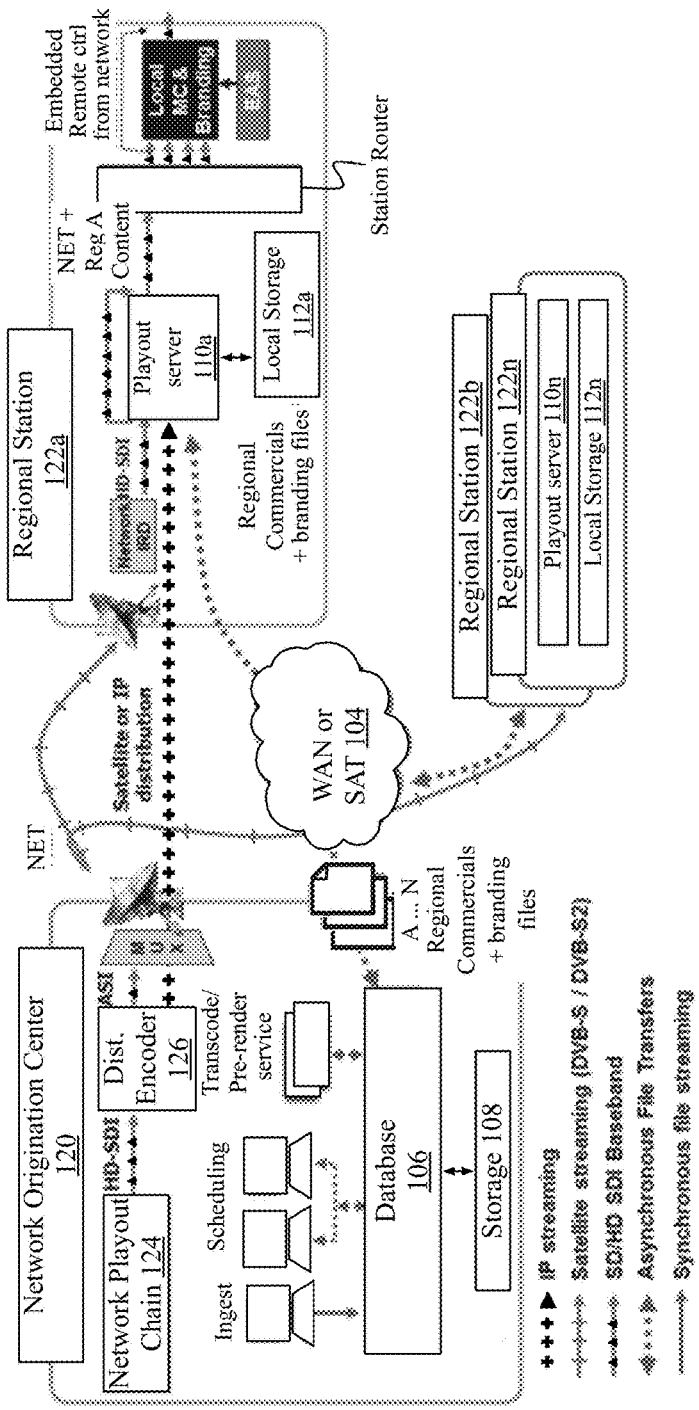

For example, referring first to FIGS. 1A-1C, illustrated are block diagrams of embodiments of content delivery in various implementations of regional networks, illustrating local playout server storage, shared playout server storage, and virtual network affiliate configurations, respectively. Beginning with FIG. 1A, as shown, a central playout facility 100 or media source may comprise workstations for ingesting media or content. In many implementations, such content may be ingested as files via asynchronous file transfers (dashed line), including network transfers via the Internet or local networks, from local storage or removable storage, or any other such interface; may be ingested via high-definition serial digital interface (HD-SDI) links from other video processing or playback devices (line hashed with triangles); or via any other means. Media or content may be stored in one or more storage devices 108, which may comprise a local RAID, network attached storage (NAS), remote storage including cloud-based storage or off-site storage, magnetic tape based storage, optical storage, or a combination of any of these or other storage means, and may, in some embodiments, be transferred via synchronous file streaming (solid line) or any other means. Media and content may be indexed in a database 106, flat file, data array, or other type and form of data file. Database entries may include unique identifiers for media, storage locations, durations, categories, classifications, types, flags, options, names, sources, languages, designated playback regions, resolutions, comments, edit or playback permissions, or any other type and form of information. The database 106 and/or media or content in storage 108 may be accessed, edited, or modified by scheduling clients or clients executing a media automation schedule manager application to control automation playlists or off-line editing workstations to modify content. In some embodiments, the central playout facility 100 may include one or more workstations, servers, or devices for transcoding or pre-rendering content into one or more other formats, including compressed formats for transmission.

Central playout facility 100 may communicate with one or more regional playout facilities 102a-102n, which may provide local rebroadcasting of content via one or more transmitters or cable connections (not illustrated). Communications between the central playout facility 100 and regional playout facilities 102 may be via one or more networks of various types, including wide area networks (WANs) such as the Internet, or satellite-based networks, which may provide simultaneous distribution of files 114A-114N to a large number of facilities 102 simultaneously. Each playout facility 102 may, in some embodiments, include one or more playout servers 110a-110n, each of which may include local storage 112a-112n. For example, in some embodiments, a playout server 110 may comprise a server, appliance, system on a card such as those discussed in connection with FIG. 3, or any other type and form of server providing media output for playback. Each server 110 may include local storage such as hard drives, flash drives, magneto-optical drives, or any other type and form of local storage, uniquely accessed by a corresponding playout server 110. Content may be pushed to each playout server 110 (or pulled by said playout server 110) directly, and may be stored in multiple locations. In some embodiments, playout servers 110 may transfer content via peer-to-peer communications, reducing bandwidth requirements for the central playout facility 100. Content may be specific to a region or playout channel in many embodiments, including branded content for a regional station or affiliate. Content may include junctions or short clips or promos for playback between segments or network shows; schedule boards or indexes of upcoming shows or media; "coming next" snipes or short segments, which may be played back over other content, either pre-rendered and "burned" into content and stored as a separate clip segment, or pre-rendered and stored as a fill/key file for keying during playback; logos and ratings bugs, which may be pre-rendered and burned into content or pre-rendered and stored as a fill/key file; alerts or crawls, which may be rendered and keyed dynamically during playback; dynamically rendered text; still images; or any other type and form of content.

In a similar embodiment illustrated in FIG. 1B, each playout facility 102a-102n may include a plurality of playout servers 110a-z. Local storage 112a-112n may be shared by playout servers 110 at a playout facility. Such local storage may be in addition to local storage of each server 110 (not illustrated). This provides for additional storage in situations when a playout server's own cache or local storage may not be large enough for storing program content. Each playout server may individually pull content from shared storage 112, as well as requesting content from other locations if content is not available in said shared storage 112, such as via peer to peer file transfers from other playout servers 110. Shared storage may comprise a RAID, a NAS, a caching proxy server, or any other type and form of storage.

In a slightly more complex embodiment illustrated in FIG. 1C, a network origination center 120 may include the features of a central playout facility 100, as well as including a network playout chain 124 for playing national content via real-time wide area satellite streaming to network affiliates and regional stations 122a-122n (line with lateral hashes). In some embodiments, as a backup or to provide content to sites without satellite downlinks, content may be packetized and/or encoded via a distribution encoder 126 and multiplexed for IP streaming (line made of crosses).

For content regionalization, region or station-specific content may be generated at the network origination center (NOC) 120 and delivered via asynchronous file transfers via WAN or SAT link 104 to playout servers 110 and/or local storage 112 (which may include shared storage, as discussed above in connection with FIG. 1B). Playout server 110 may control switching from/to network feeds including satellite and IP streamed feeds and playback of local commercials and branded or station or region specific content. In some embodiments, the regional station 122 may also include a local station router, which may control switching from/to the combined network and regional content from playout server 110 and local content, advertising, or branding and/or emergency alert service (EAS) decoder outputs. In some embodiments, the local content and switching may be provided by a second playout server 110, or a second core or playout engine on a multi-core playout server. In such embodiments, switch automation playlists may be sent from the network automation center 120 to both the regional playout server and local playout server, allowing centralized control of even transmitter or channel specific content playout.

For example, in one implementation, the network origination center 120 may play a network programming feed as a linear feed. A regional station broadcaster 122 may receive and retransmit the national network linear feed, as well as playing back regional content and local content. Such localized content may be provided by the network origination center 120 in an offline asynchronous transfer. The playout servers may, in some implementations, act in a pass-through mode to deliver upstream content for most of the time, and insert local or regional commercials, content, or branding as indicated by an automation playlist or embedded command. In this model, regional stations may be referred to as a "virtual network affiliate", as the output of the station is a regionalized version of the main network feed (such as the NOC-originated feed, but with NOC-originated regional commercials), providing the same functionality of a fully-staffed regional facility or affiliate, but at a fraction of the cost. Accordingly, local playout servers may act as a regional commercial server, rather than a mere switcher or brander. Limited or no manual intervention at the regional playout facility may be required, instead with control carried over embedded triggers in the network signal from the NOC.

Content may be delivered in compressed formats, including MPEG 2, H.264, JPEG2K, AVC-Intra, or any other type and format for content, including video, animated content, still images, audio, or 3D content. In some embodiments, timecode may be generated locally at each regional station 122, or may be delivered via ancillary time code (ATC) carried on the HD-SDI stream. In some embodiments, content may include internal triggers to trigger playlist control, including subsonic audio signals, options in digital packet headers, or other means.

Because regional stations 122 may be unmanned, playout servers 110 may include self-monitoring capability, including silence or black detectors, playback error detection, performance monitoring, or other probing, and may include the ability to stream a proxy signal to the NOC or central facility for remote viewing. In other embodiments, an embedded fingerprint in the network signal or regional content may be separately streamed to the NOC or central facility for comparison to an expected fingerprint, as a first line of confidence monitoring, allowing automatic error detection and notification.

In some implementations, to meet high availability requirements of broadcasters, the NOC may maintain duplicates of critical automation metadata in a separate storage account in the same cloud service or a different cloud service, and playout servers 110 may be configured to switch to the second account or service in case of a failure of communications with the primary account or service. Asynchronous communications from the playout servers to the NOC and/or cloud system may include encryption, such as HTTPS, to provide a secure logon. Similarly, to provide for security for configuration and editing of playlists, remote access to the media distribution and maintenance system may be via HTTPS or other encrypted protocols, with secure logon provided by a single sign on approach, such as registering of email addresses and logons with third party identity providers, such as Facebook, Google, or Windows Active Directory. For example, if a user is not authenticated with the cloud system, the user's device may be redirected to a third party authentication and token provider, where the user may input their credentials. Upon verification, the third party provider may provide a token to the device, such as via a browser cookie or other mechanism. The user's device may provide the token to the cloud system, which may determine whether the user's account, email, or other credentials identified in the token are authorized, and accordingly provide or refuse access. In other implementations, such as where a client device does not present a user interface to a user or for automated connection, a certificate based authentication system may be utilized. In still other implementations, a representational state transfer (REST) API may be used to request access to media or other data from the cloud system or NOC via a time-limited shared access URL, at which the data may be subsequently obtained.

Figure 2A:
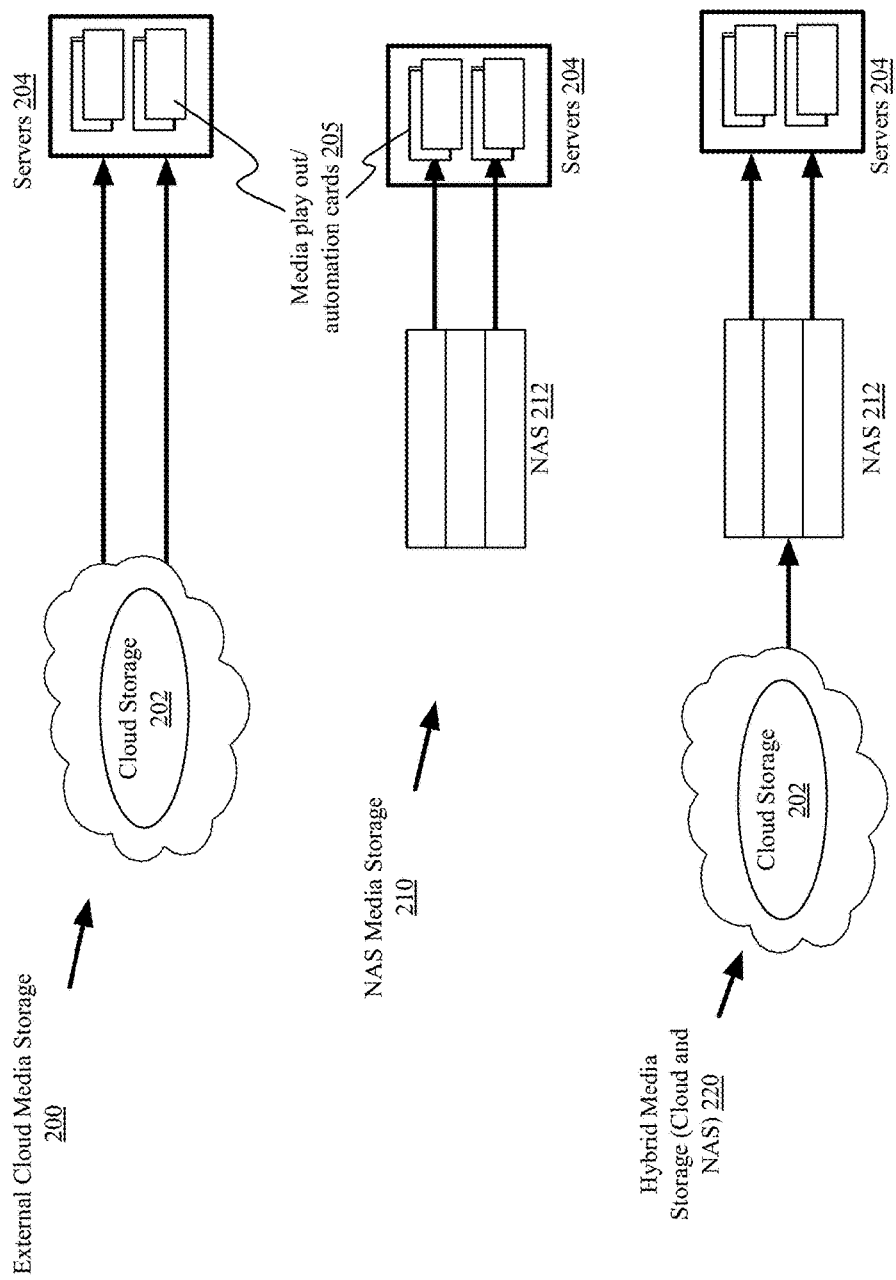
FIG. 2A is a block diagram of various models of content storage and delivery.

Referring now to FIG. 2A is a block diagram of various models of content storage and delivery. In a fully hosted model 200, assets, such as media or content, may be hosted on cloud storage media 202 and transferred to playout servers 204 as necessary. Assets may be added to cloud storage via a user interface allowing ingesting, quality verification, and editing of metadata, and transmission to the cloud storage provider. Playout servers 204 may download files to a local cache for playback, according to a playlist schedule. For example, content may be downloaded a predetermined time period in advance of scheduled playback, such as a half hour, an hour, 12 hours, a day, or any other time period. In other embodiments, playout servers 204 may download all scheduled files, regardless of schedule time. File transfer percentage may be displayed in the user interface, allowing the user to view the status of transfer completion to remote stations. Files may be transferred serially or simultaneously, according to a configurable limit.

Advantageously, this model 200 does not require any local storage other than the on board cache of playout server 204. Accordingly, a server 204 may be connected to the Internet anywhere in the world and be ready to access and play content immediately. Different cloud services may be used, including public or private cloud service providers, or cloud storage maintained by the broadcaster or media provider. As shown, in many implementations, a server 204 may include one or more automation and/or media play out devices 205. These devices 205, discussed in more detail below in connection with FIG. 3, may comprise blade servers, or servers on cards (e.g. single card servers), with independent processors, network interfaces, storage, etc.

In a local NAS-based model 210, servers 204 may be located locally to NAS storage 212 storing media content, such as playout servers 204 that are located at the NOC. In such implementations, servers 204 may access the NAS storage 212 or similar storage directly without requiring outside network access. In a similar remote NAS-based model (not illustrated), servers 204 may be connected to a local NAS 212 at the remote location, with content delivered to the NAS 212 via high speed transfer mechanisms, such as high speed file delivery or network accelerator systems. The NAS 212 may mirror content at the NOC or mirror a subset of the content relevant to the local playout servers, which may access the NAS and download files directly as if they and the NAS were both co-located at the NOC as in model 210.

In a similar hybrid model 220, installations with many channels may combine the cloud-based and NAS-based models by pre-caching media on the local NAS 212 in advance of available cache space on the edge playout servers 204.

Figure 2B:
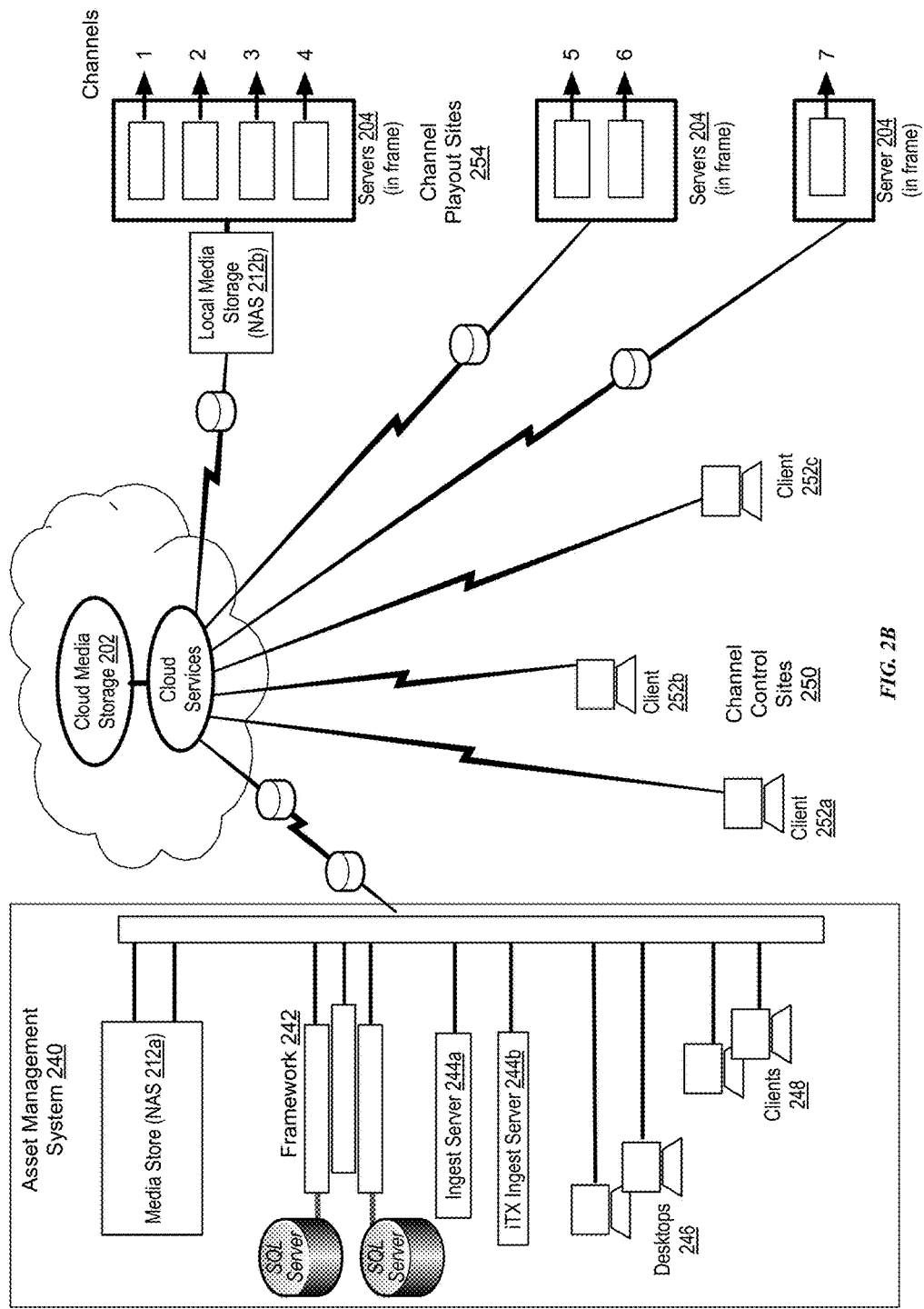
FIG. 2B is a block diagram of an exemplary system architecture for content storage and delivery.

FIG. 2B is a block diagram of an exemplary system architecture for content storage and delivery. As shown, a cloud storage system 202 may communicate with one or more stations or channel playout sites 254 including playout servers 204 (illustrated as systems-on-cards for installation in multi-card frames, although other devices or form factors may be employed). As shown, one playout site 254 may include a local media storage NAS 212b for use in the hybrid model 220 discussed above.

An asset management system 240 may, in some embodiments, be used for ingesting media via one or more ingest servers 244a-244b. A database may be provided by one or more framework servers 242 for indexing media and maintaining playlists. Such a database may comprise a SQL based database or other format, and may be highly scalable and resilient, with a live backup as shown. Although shown co-located, in many embodiments, framework servers 242 may be distributed geographically. Additionally, in some embodiments, the database may be stored in cloud storage or provided as a service via a cloud hosting provider, for reliability. Media may be stored on local storage, such as a NAS 212a. In some embodiments, media and/or playlists may be edited or configured via desktops or client computers 246-248, as well as remote clients 252a-252c at one or more channel control sites 250. This may be done via a user interface such as the one discussed in more detail in connection with FIGS. 6A-6O below and hosted by framework servers 242 and/or cloud service providers executing web servers. Such web servers may be load balanced, providing scalability and reliability, with the ability to deploy additional servers in case of high load, as well as rolling restarts during upgrades with no loss of availability to the users. Communications from clients 252 may be via standard HTTPS communications, such as Representational State Transfer (REST) requests, without requiring any special firewall rules or port forwarding. Similarly, desktops 246 and clients 248 may access the user interface and media distribution system via the same method. This may allow these desktops to be deployed within a secure network and still access the external media distribution and management system. Real time updates to the media distribution and management system may be propagated throughout the system, typically in less than a second. The user interface may auto-update, such that the user does not need to refresh a browser or other application to see the latest statuses.

To provide reliable delivery, all communication with the media distribution and management system may be via a transactional model or reliable transmission method, such as TCP or similar protocols, to provide for reliable transfer in case of network connectivity issues. Transactions or messages may be kept for at least 30 minutes before being removed, in some embodiments. Playout servers 204 may cache and maintain local automation lists, allowing the servers to keep working as long as they have access to media and schedules. This may allow for network outages of substantial duration, particularly in the hybrid model with local storage at the playout site 254. Messages for transmission during the interim, including logging and status information from playout servers 204, may be queued for transmission upon restoration of connectivity.

Multiple logs may be maintained, providing flexible and powerful investigation of errors or traffic management. Transaction logs may include a record of every operation performed by the playout server 204, the time it occurred, and how long it took, as well as maintaining a record of device or user IDs or names for inbound messages. For example, a log may include identification of a time, server, module, type (e.g. information, error, etc.), an account name, a unique client identifier, a message (e.g. status update, alert, etc.), details including files played back or other statuses, and elapsed time. User action logs may record commands from users, such as account names, user ids, actions (e.g. delete event, add event, edit metadata, etc.), details regarding the event or item, and a time. To uniquely identify media and content, each instance of an item in a playlist may have a globally unique identifier, that may be stored in an item status history log with the time at which it occurred. Such item status history logs may reduce the necessity of searching hours of transaction or user logs for issues with a specified item. As run logs may be maintained to provide an exact copy of the schedule as transmitted with frame accurate start times supplied by the device. As items are transmitted and moved to a done state, they may be moved from the live channel to the channel history, triggering an entry in the as run log. The history may be indexed by day and stored for any amount of time. In some embodiments, history schedules may be loaded into spare channels to allow re-running of a playlist. Such as run logs may be required for some traffic systems. In other embodiments, traffic systems may require the as run log in a specific format with a limited set of properties. Such logs may be dynamically generated from the channel history as required or periodically, or queried in real time via a RESTful API.

Figure 2C:
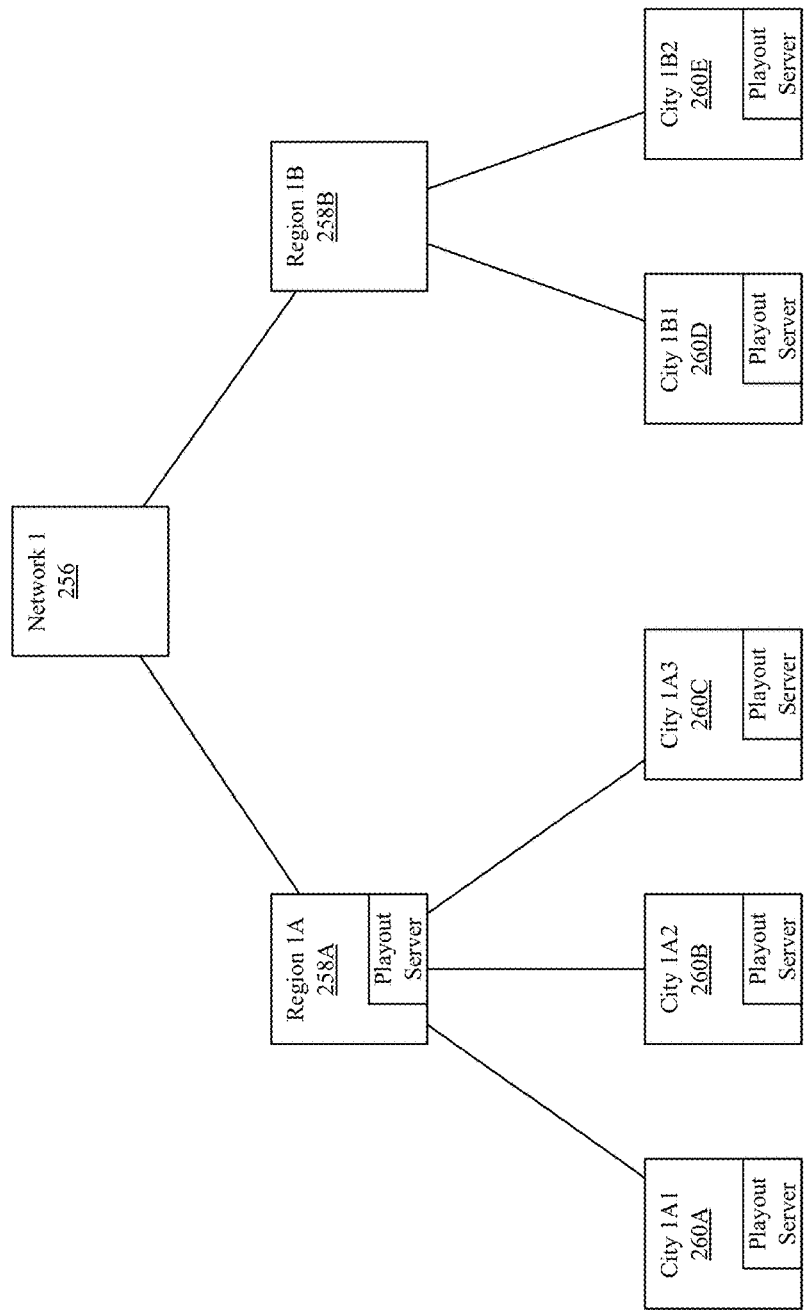
FIG. 2C is a tree diagram of an embodiment of a channel hierarchy for content delivery.

Rather than utilizing individual playlists, the media management and distribution system may employ a hierarchical model to propagate schedule edits. Channels can be linked together to form complex hierarchies and changes made at one level propagate down to all sub channels without losing any local changes that may have been made in those channels. Example hierarchies include simple master-slave relationships for redundancy through to complex tiered relationships where a master network channel feeds a number of regions and inside each of those regions multiple individual cities each with a redundant pair of channels. The advantage of this model is that major structural edits to the schedule only need to be made in one place and not many different schedules. For example, FIG. 2C is a tree diagram of an embodiment of a channel hierarchy for content delivery. A network 1 256 may form a top node of a tree, and may include two regions 1A 258A and 1B 258B. Region 1A may further include three cities, City 1A1 260A, City 1A2 260B, and City 1A3 260C. Similarly, Region 2B may include two cities, City 1B1 260D, and City 1B2 260E. Schedules may be maintained for each node or channel, with schedule additions, deletions, or changes at any level propagating to lower level channels.

A schedule may comprise a collection of events representing a block of time, such as a schedule day or a day part. A channel may comprise a continuously moving block of time usually associated with a playout device. When a schedule is added to a channel, it may be performed as a copy or as a link to the original schedule. For example, a schedule may be appended to a channel as a link. A user may add multiple different schedules to a channel at the same time. For example, the user may wish to load up three or four day parts, or even several days of schedules across a long weekend to give the devices maximum warning for content caching. In some implementations, the user may then make changes to the schedule either directly in the channel or by loading up the day part in a schedule edit menu of a user interface and adjusting it there. Once the schedule has been added to a channel, any changes made in the schedule directly affect the channel. Similarly, schedule changes made by an operator in a live channel may also be displayed via the user interface, as well as the live status of events.

In some implementations, unless the user utilizes a copy method, the user may only add a schedule to a channel once and any given schedule can only be added to one channel. To use the same schedule in multiple channels, the user may instead add the schedule to a master channel with all the sub channels as children, such as adding the schedule to a channel for Region 1A 258A, rather than individually to Cities 1A1, 1A2, and 1A3 260A-260C. Conversely, if the user adds the schedule via a copy method, the user may break the connection to the original schedule and may therefore add the same schedule over and over again to a channel. However, the copies are considered separate schedules, such that any changes made in the schedule will not be propagated to other channels or schedules. This method is mainly useful when testing or doing demos.

In many implementations, it is not necessary for a channel to have a device attached it to it. Instead, the channel may be a "virtual" channel and schedule used to manage changes to channels at lower levels in the hierarchy. For example, as shown in FIG. 2C, Network 1 256 and Region 1B 258B do not include playout servers. These channels serve only to facilitate the distribution of new schedules and changes to lower level channels. In this situation, the operator would not see any status messages being received in the virtual channel and therefore it may not be obvious where in the playlist the current time is. Accordingly, in some implementations, the user may use a virtual device server that is a software module that can attach to and mimic a number of devices. These simulators can provide status messages and progress through the playlist as a real device would.

In some embodiments, when an item is added to a channel, it is also added to all of the channels below that point in the channel tree hierarchy. The tree may have no limit on depth or number of children. The item may keep the same globally unique ID (GUID) in each of these sub channels, such that if it is later modified in the parent channel, the changes can be replicated to the correct items. It is this GUID that links the items in the channels together and not their position in the list, so it is possible to add additional items in the sub-channels without destroying this linkage. However, locally added items will change the timing of the sub-channel if something else isn't removed to compensate. Because the additions and removals will not propagate upwards, the user may maintain the local channel playlist directly, as the additions and removals would not be visible to the top level network channel. Typically schedule edits take only a few seconds to populate through systems with even complex hierarchies of hundreds of channels.

One of the most common requirements is to be able to replace content from a master schedule with different local content, such as local advertising or promos. For example, if a user wished to replace the last item in a network break with a different commercial, the user may use an Item Replace function to replace the media within the item while keeping the original schedule slot. By maintaining the link in this fashion, the user may later remove the last item in the break at the network level, and all of the sub channels will also have that item removed, even if the content is different due to the item replace.

In one implementation, when an item is replaced it is marked as such in the playlist. This may prevent any replacements in the parent item from affecting those changes. For example, if a first commercial is replaced in a first city in a region, and the commercial is later replaced at the region or network level, it may propagate to other cities in the region without propagating to the first city. Conversely, to force all cities to use the same commercial as the network even after such localized modifications, rather than use a replace item command, the user may remove the item from the master network. As discussed above, this may propagate down and remove all instances of the commercial from the child playlists, regardless of the content. The user may then add a new commercial, which will again propagate down to all cities.

When replacing content, it is often the case that it may have slightly different durations, so small timing errors can occur between channels. To rectify this in some implementations, fixed time events may be scheduled in the master channel to ensure that all the child channels are realigned at the end of the commercial break.

Figure 2D:
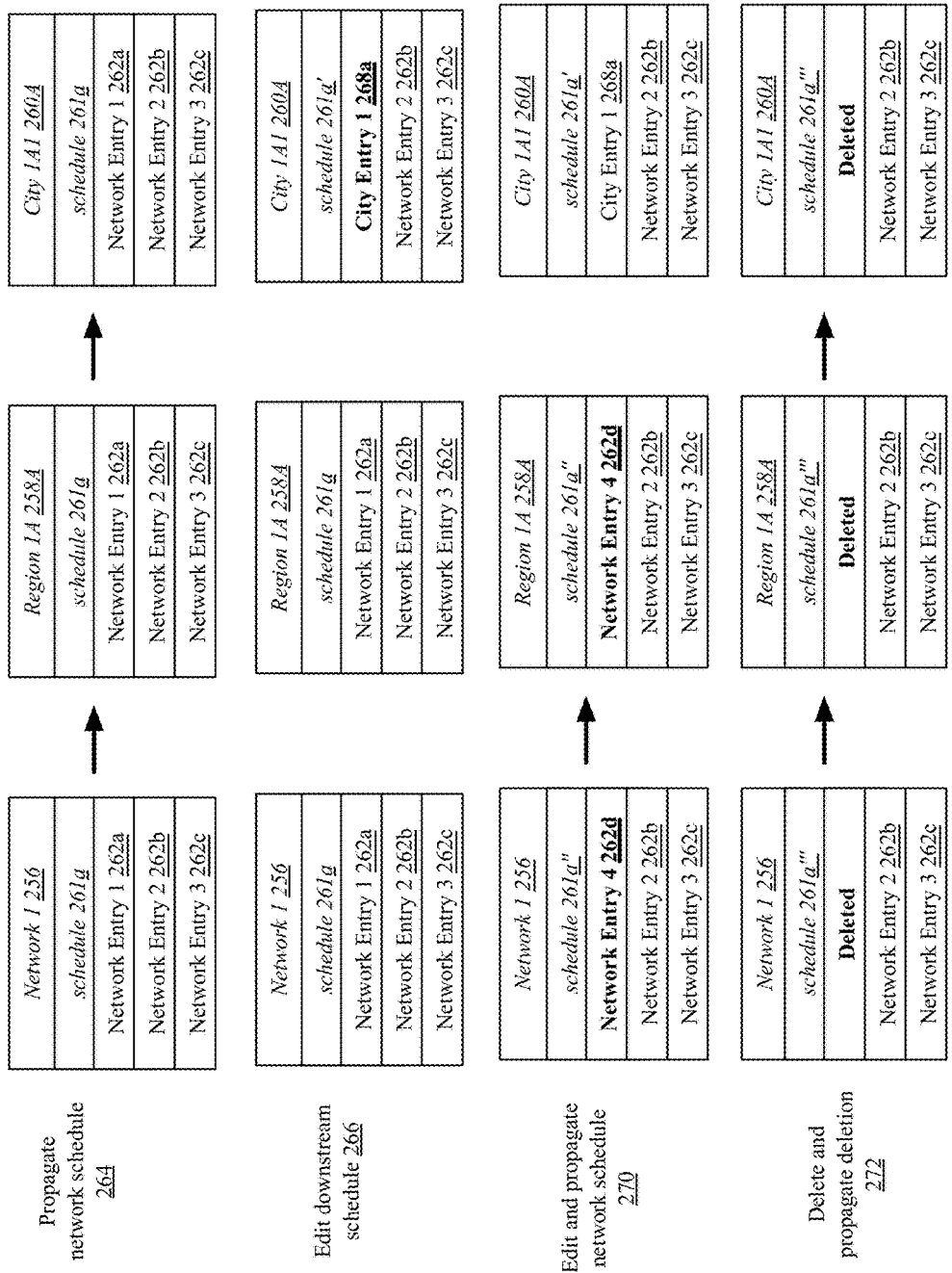
FIG. 2D is a diagram illustrating propagation of edits to an exemplary playlist in the channel hierarchy of FIG. 2C.

Referring now to FIG. 2D, illustrated is a diagram showing propagation of edits to an exemplary playlist in the channel hierarchy of FIG. 2C. As shown, at step 264, a schedule 261*a* with three network entries 262*a*-262*c* may be generated and/or loaded into a channel for Network 1 256, and may be propagated at step 264 to the channel for Region 1A 258A and City 1A1 260A, such that each site has the same schedule 261*a*. At step 266, a user may edit the downstream schedule for, for example, City 1A1 260A to replace the first entry with a local item such as city entry 1 268*a*. The channel's schedule 261*a*' is now similar and linked to the parent schedules, but distinct.

At step 270, the user may modify the Network 1 256 schedule to replace the first network entry with network entry 4 262*d*, creating schedule 261*a*". This change may be propagated to the Region 1A 258A schedule, but may not be passed to the City 1A1 260A schedule 261' in which the entry has been replaced.

However, because the entries are still linked, at step 272, the user may delete the first entry in the Network 1 256 schedule (creating schedule 261*a*"), which may be propagated to both Region 1A 258A and City 1A1 260A, again resynchronizing the schedules.

In some embodiments, the system may allow rule-based schedule content replacement to increase efficiency of schedule editing. Rather than having to build different versions of channels, the user may simply set up rules to control what needs to be replaced on a channel by channel basis. This can be done in advance for fixed replacements or changed on a regular basis, which will then apply the new rule retroactively to any items already in the channel. Replacements can be applied to any type of item including secondary events such as logos. For example, a user could set up a replacement rule to replace the channel logo that was scheduled in the master channel with a different version for each local station. Or a user may set up a rule to replace all network promos with a specific naming convention with a local version according to a traffic list of daily list of promos to be replaced in each channel with the required alternative.

The rules for replacement may be a simple "replace x with y" or may use more complicated pattern matching and/or Boolean logic, such as "replace all clips with the name promo-xxx with promo-xxx-city1". A separate graphics workflow would then be responsible for generating all the local versions of the promos. If an item that has been replaced by a rule is not available within a set time before transmission, in some embodiments the item reverts back to using the network scheduled version of the event to avoid dead air.

In some embodiments, any assets that don't exist at the point they are added to a channel may be marked as missing in the channel and brought together in a single master missing material list, which may provide a time sorted list of all items missing across all channels. In a situation where a missing item is used on multiple channels at different times, then the item may appear in the missing list only at the time of first transmission in some implementations, to reduce clutter. When a new asset appears in the media management and distribution system, it may be checked against the missing list and, if it is an item that the system is waiting for, it may be removed from the list and all channels are updated with the asset details. This may mean a change in schedule timing if the asset is a different duration from the placeholder originally scheduled.

Because the media management and distribution system keeps track of every instance of an asset in every schedule and channel, it is able to update any asset details if they are modified and also warn operators that try to delete an item that it is in use. If an item does get deleted that is used in channels and schedules then it will get added to the missing material list.

In some embodiments, the media management and distribution system may allow time zone offsets in channel schedules, affecting both the way time is displayed in the schedule grid and also how entered fixed times are interpreted. The time zone may be set using a channel type so it can be applied to a number of channels. This may be crucial for geographically large networks. When a schedule is being edited in the schedule edit menu, in many implementations, the user may work in UTC. Any fixed times entered may be converted to the correct local time when appended to a channel. For example, the user may create a schedule with a fixed start time of 12:00:00:00, and if the user adds the schedule to a channel for an east coast station in EST or a west coast station in PST, the schedule may still start at 12:00:00:00 local time for both stations.

In some embodiments, a channel offset feature may be used to offset a channel's fixed events by a specific amount forwards or backwards. This can be used to create a time zone shifted channel automatically by making it a child of the master channel and setting its channel offset to the correct delay. This may be more intuitive for broadcasters separated from UTC; for example, a broadcaster with stations in the Eastern time zone and Pacific time zone may be more comfortable thinking of the latter station as having a 3 hour offset, rather than having a 5 and 8 hour offset from UTC, respectively. If a further embodiment, the user may set a positive delay to use the channel as a preview channel to view the schedule prior to transmission.

Optional daylight savings start and end times can be set in the channel configuration, and will have the effect of automatically adjusting the displayed timecode values for daylight savings. During daylight savings, fixed times entered will have the DST adjustment applied, such that they may be un-applied after daylight savings time ends.

The media distribution and management system may receive UTC time signals and may operate in UTC as a global system. However, it is possible to configure time zone offsets on individual channels so that times are shifted to local time on the user interface as discussed above. All system logs may remain in UTC. However, the log output may be shifted to local time for viewing by the user in the user interface to aid with system diagnosis. Individual edge playout devices can either be locked to UTC via NTP or by a local LTC time source.

The media distribution and management system has the ability to raise a variety of alerts for problems with the system, including devices going offline or items failing to play. Alerts are sent to all clients that have subscribed to receive them and appear in the alerts list on the Home screen of the user interface, discussed in more detail below. Some alerts automatically clear themselves when the problem goes away (e.g. network connectivity issues), but in the case of an item failing to play, the alert may stay in the list until it is manually removed. This may be important for tracking dead air for compliance issues.

Additional alerts can be configured for a schedule running out or an item not being ready within a configured time of its on air point. These settings may all be configured on a channel specific basis. For critical alerts, the media distribution and management system may send emails to users, SMS texts, voice calls, or other notifications.

Figure 3:
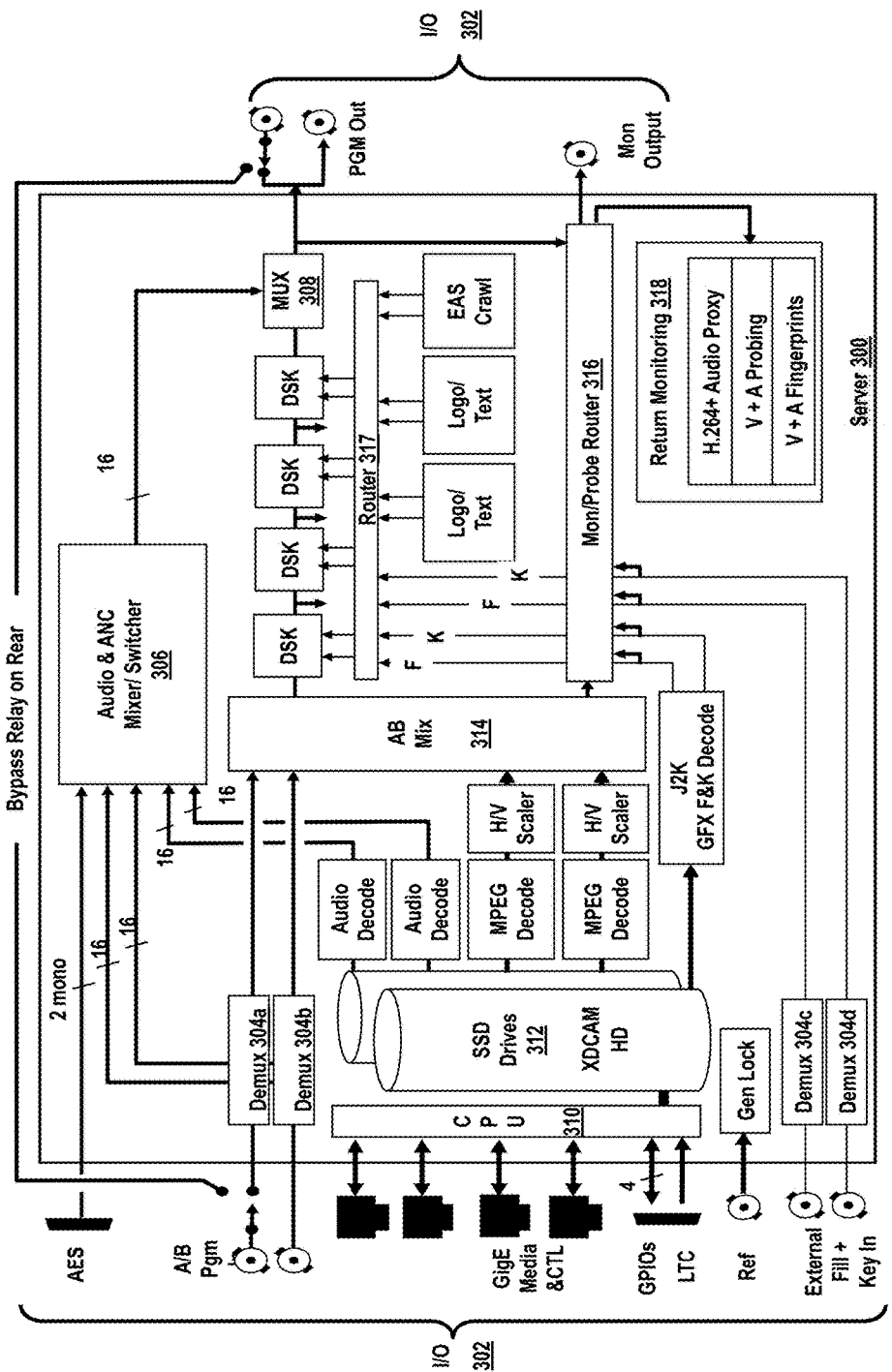
FIG. 3 is a block diagram of an embodiment of a play out server.

FIG. 3 is a block diagram of an embodiment of a play out server 300, which may be an example of playout servers 110 or 204. The server 300 may comprise a blade server, workstation, appliance, server, desktop computer, rack-mount computer, or any other type and form factor of device. In one embodiments, the server 300 may comprise a system on a card and may be mounted in a multi-card chassis or frame with other servers 300 and share one or more power supplies. The server 300 may be referred to variously as a play out server, a server device, a server card, a single card server, or by any other such similar terms, and may be in any of the above described forms or any other form of computing device or devices.

The server may include various input/output interfaces, including AES/EBU audio inputs; video inputs and outputs including multi-channel video or video with one or more embedded audio channels; serial (e.g. RS-232 or RS-422) and Ethernet communications; monitoring outputs; general purpose input/outputs (GPIO) contact closures or triggers; linear time code (LTC) inputs; word clock, black burst, or tri-level sync; loop sync; fill and key inputs; and/or any other type and form of input or output. For example, video may be demultiplexed via demultiplexers 304a-304b to extract embedded audio channels, which may be mixed by audio or ancillary data mixer/switcher 306 for multiplexing with an output video signal by multiplexer 308. Audio may be in any format, including 48 kHz PCM, Dolby-E/AC3, or any other format, and may have any number of channels, including mono, stereo, 5.1, 7.1, 7.2, 16 mono channels, or any other number or arrangement. Audio/ancillary data mixer 306 may support SMPTE 436M data including 8 bit data, ANC packets and VBI lines carried with 436M data. Audio/ancillary data mixer 306 may provide, in some embodiments, per-channel audio equalization, compression, expansion, gating, or other effects. Audio sources may come from audio clips, video program inputs, external fill/keys, or AES/EBU inputs from other devices.

In some embodiments, the server may be locked to various reference modes, including external sync references, internal reference signals, or an input HD-SDI signal.

The server 300 may operative in various modes, including SDI 525/60i; SDI 625/50i; HD-SDI 720p/50; HD-SDI 720p/59.94; HD-SDI 1080i/50; HD-SDI 1080i/59.94; HD-SDI 720i or 1080p; or any other mode.

The card may include a central processing unit (CPU) 310, which may comprise any type of CPU including single or multi-core CPUs. The CPU may comprise any logic circuitry that responds to and processes instructions and interfaces with network interfaces and storage 312. The central processing unit may be provided by a microprocessor unit, such as: those manufactured by Intel Corporation of Santa Clara, California; those manufactured by Motorola Corporation of Schaumburg, Illinois; those manufactured by Apple Inc. of Cupertino California, or any other single- or multi-core processor, or any other processor capable of operating as described herein, or a combination of two or more single- or multi-core processors. CPU 310 may manage storage on one or more storage devices 312, such as solid-state drives or memory caches. As discussed above, content and media may be stored in local memory of the server 300, such as on storage 312. Audio content may be decoded and sent to mixer 306, and video content may be mixed via AB mixer 314 with other stored media or video received via video inputs 302. A/B mixer 314 may allow transition between back to back clips, live video and stored clips, or live to live video. Transitions may include cuts, cross fades, v-vades, cut-fades, fade-cuts, u-fades, or any other type and form of transition.

Downstream keying (DSK) may be applied in one or more stages to the output of A/B mixer 314, with fill and key elements, logos and text, and EAS crawl messages provided locally on the server, received from external fill and key devices and demultiplexed as necessary via demux 304c-

304*d*, or retrieved from storage 312, including JPEG2K images, animations, and other graphics. These images and fills may be routed to various stages via router 317. Keyers may be individually configurable for gain, clipping, transparency, masking, etc., and may be assigned to any graphics source via router 317. The server 300 may support OXA animation and OXT files, and may position logos and stills anywhere on the screen. In some embodiments, the server 300 may include a zero/deterministic load time (ZLT) engine for playing pre-rendered JPEG2K full-screen animations, positioning the animations anywhere on the screen, playing back to back animations, or looping or repeating animations. The animations may, in many implementations, include audio to playout via mixer 306.

To provide monitoring, a monitor/probe router 316 may select and route various signals to an output, including A/B mixer 314 output, post-DSK and audio MUX 308 output, or fill and key signals pre-DSK. The router output 316 may also be sent to return monitoring 318, which may comprise a server, service, daemon, routine, or other executable logic executed by CPU 310 for transmitting a multimedia stream to a central facility, such as via a network interface and the Internet. Monitoring 318 may include an H.264 or other protocol streaming video proxy, as well as probing and fingerprinting extraction and monitoring. In some embodiments, confidence monitors and associated audio monitors may be displayed in a user interface via a web server provided by server 300.

The server 300 may, in some embodiments, comprise a multi-slot card or card and daughter cards in a chassis, as discussed above. In one such embodiment, the card may have a low power requirement, consuming less than 50 W of power. In many embodiments, the card may have a bypass relay that routes a program in signal to a program output connector, responsive to loss of power, loss of functionality or CPU error, or manual bypass command.

In some embodiments, the server 300 may receive and respond to embedded SCTE control commands, including SCTE-104 format commands such as cue/play/stop/unhold/take-next or other commands embedded in the vertical ancillary data space (VANC) of the input video signal.

The server 300 may execute a playlist received or retrieved from the media distribution and management system and/or cloud storage. In some embodiments, playlists loaded from an external source can be updated even after being downloaded, including inserting new items, deleting items, or changing attributes for items. This may be limited to items not within 30 seconds from air, to prevent errors. Events may be held/unheld; cued; taken to air (if cued); or joined in progress for events already playing. In some implementations, if the server 300 attempts to air an event and fails, the server may re-try the event, joining in progress with where the event should be. If an event cannot be aired (for example, due to missing media or a failed clip), the playlist engine may substitute the event for evergreen content, or may display an apology slide. In playlist hold mode, in some embodiments, the server 300 may allow the user to replace the next event to air, to substitute a commercial for example. Primary events may be executed based on a fixed time to air, automatic (time determined by the end of the previous event), or manual (triggered upon a take-next or unhold command) mode. Primary events may include clips, live events via one or another program source, or stills. Secondary events, nested within a primary event, may be set to start with a relative offset from the start or end of the primary event, such as predetermined commercial breaks. In some embodiments, a suppress-logos secondary event may be used to suppress all logs displayed. Other secondary events may include logos, animations, external fill/key, voiceovers, logo suppression, v-chip commands, or even triggered software upgrades. The server may also support manual controls, including manual control for selection and keying of a logo, cutting to live while allowing the playlist to continue running, or providing an external voiceover.

As discussed above, media may be pushed to the cards or periodically retrieved by the cards, including via HTTP, HTTPS, CIFS, SMB, FTP, SFTP, or any other type and form of transfer protocol. The server 300 may include credentials for logging into secured locations. In some embodiments, the server 300 may determine a lowest-cost location to retrieve an asset from, including local caches, peer-to-peer retrieval, cloud storage, NOC storage, or any other location. If local storage becomes full, the server 300 may delete un-used assets or furthest-to-air assets.

Figure 4A:
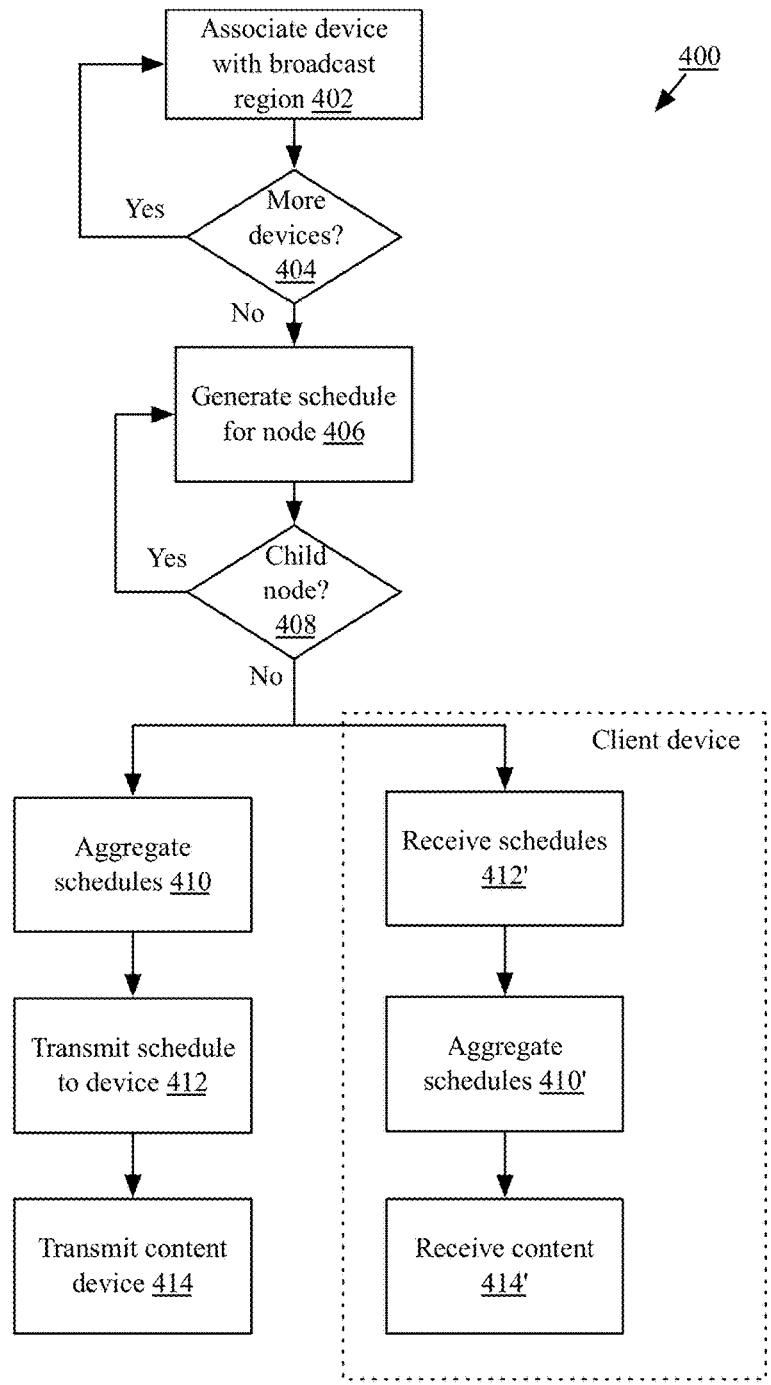
FIG. 4A is a flow diagram of an embodiment of a method for generating a hierarchical media automation schedule.

FIG. 4A is a flow diagram of an embodiment of a method 400 for generating a hierarchical media automation schedule. At step 402, one or more devices may be associated with a broadcast region by a media automation schedule manager, administration or management device, or similar device. Broadcast regions may be physical regions, such as cities, states, terrestrial broadcast areas, or other such regions; may be abstract or conceptual regions such as a first channel or second channel (which may be broadcast to different or the same geographic regions); or may be virtual regions that are not associated with a device. The regions may have a hierarchical relationship, with one or more regions being child nodes of a first region within a tree hierarchy. For example, a first device may be associated with a national region which may be a top level node in the hierarchy. The national region may have a plurality of child regions corresponding to time zones within the nation; such regions may be virtual, with no directly associated devices. Each virtual time zone region may have further children regions for states, cities, local areas, etc., which may be associated with individual devices. Associating a device with a region may comprise setting an identifier for the device of a node within the hierarchy corresponding to the region. For example, a first node, associated with a first region, may have a region ID of 1, which may be set for the device so that the device may identify which automation schedules should be executed by the device. As shown, at step 404, if more devices exist, step 402 may be repeated for each device. In some implementations, an administrator may set identifiers or explicit associations with a region for a device, while in other implementations, a device may determine its association based on network topology, geolocation, station titles, or any other such information.

At step 406, a first media automation schedule may be generated for a parent node in the hierarchical tree. The media automation schedule may identify sources, content, graphics, or other features and associated start times, end times, and/or durations; transition types and durations; content formats; additional processing parameters; or other such information. For example, the media automation schedule may identify a satellite channel for a source stream to be aired at a first time; a multimedia file to be obtained from a URL for playback as an interstitial advertisement at a second time; etc. In many implementations, the first media automation schedule may be a top level schedule, such as a national or global schedule, or a schedule for a main network feed.

At step 408, if there are any child nodes of the parent node, step 406 may be repeated for each child node. This process may iteratively continue until all schedules have been generated. In many implementations, generating a schedule for a child node may comprise generating a schedule including entries of each difference from the parent schedule, but without including any entries that are identical. For example, a first schedule for a top-level node may have a first entry identifying a program; a second entry identifying a first advertisement to be played at a predetermined break time; and a third entry identifying a second advertisement to be played after the first advertisement. A second schedule for a child node may include only a single entry for a regional promotion to be played in place of the first advertisement, such as a promotion for a regional news program to be aired later. A third schedule for a further child node of the second schedule node may include an entry for a local advertisement to be played in place of the second advertisement, but need not include the entry for the regional promotion if it is to be aired, as the third schedule is a child of the second schedule. Accordingly, schedule generation may include only generation of entries different from the aggregated schedule of the parent node.

In some implementations, at step 410, a server device may aggregate the hierarchical automation schedule to generate one or more aggregated sets of automation instructions for a corresponding one or more devices. Aggregating a schedule for a device may comprise retrieving a schedule of a top level or parent node in the tree; retrieving a child schedule and, for each entry in the child schedule, replacing a corresponding entry in the top level schedule with the entry in the child schedule. This may be repeated for each child node in the hierarchy that is a child of the previous node until reaching a node corresponding to the device. Accordingly, the server device may generate a set of automation instructions that correspond to the top or parent automation schedule, modified according to any intermediate or child schedules, thus "rolling up" any automation changes specific to the device and any intermediate regions, but without requiring extensive copying or recreation of duplicate automation schedules. In some embodiments and as discussed in connection with FIG. 4B below, aggregation may include identifying a node within the hierarchical tree corresponding to a device for which a schedule is to be generated, such that schedules from parent nodes of the identified node may be aggregated together. Aggregation may also be variously referred to as assembling, building, generating, or gathering automation instructions from a plurality of linked schedules, according to their hierarchical parent-child dependencies, and replacing parent schedule entries with corresponding child schedule entries.

At step 412, the server device may transmit an aggregated schedule or set of automation instructions to the device. The schedule may be transmitted via any type and form of network, including as ancillary data on a satellite media distribution system; via the Internet; via email or other file transfer; or any other such method. At step 414, in some implementations, the server device may transmit one or more items of content to the device. Content may be transmitted or streamed in real time, or transferred as a file for storage and subsequent playback. In many implementations, content that will be played at a future time according to the aggregated set of instructions may be transferred to the device. For example, local advertisements may be produced and stored at a NOC and transferred to a device at a local affiliate for future playback according to a set of aggregated automation instructions for the device.

Although discussed above with aggregation being performed by the server device, as shown, in some implementations, the hierarchical schedules may be transmitted to the client device at step 412', and the client device may perform aggregation of the schedules at step 410'. As shown, the client device may also receive content at step 414'. The steps in these implementations may be similar to the implementations discussed above in connection with steps 410-414. Implementations in which the hierarchical schedules are provided client devices may require more data to be transferred to the client device. However, automation schedules are frequently relatively small or easily compressed, and transfer bandwidth may not be a concern. Furthermore, by providing the hierarchical schedule to a client device, the client device may utilize greater intelligence in recovering from errors, such as when content is not available, as discussed below in connection with FIG. 5.

Figure 4B:
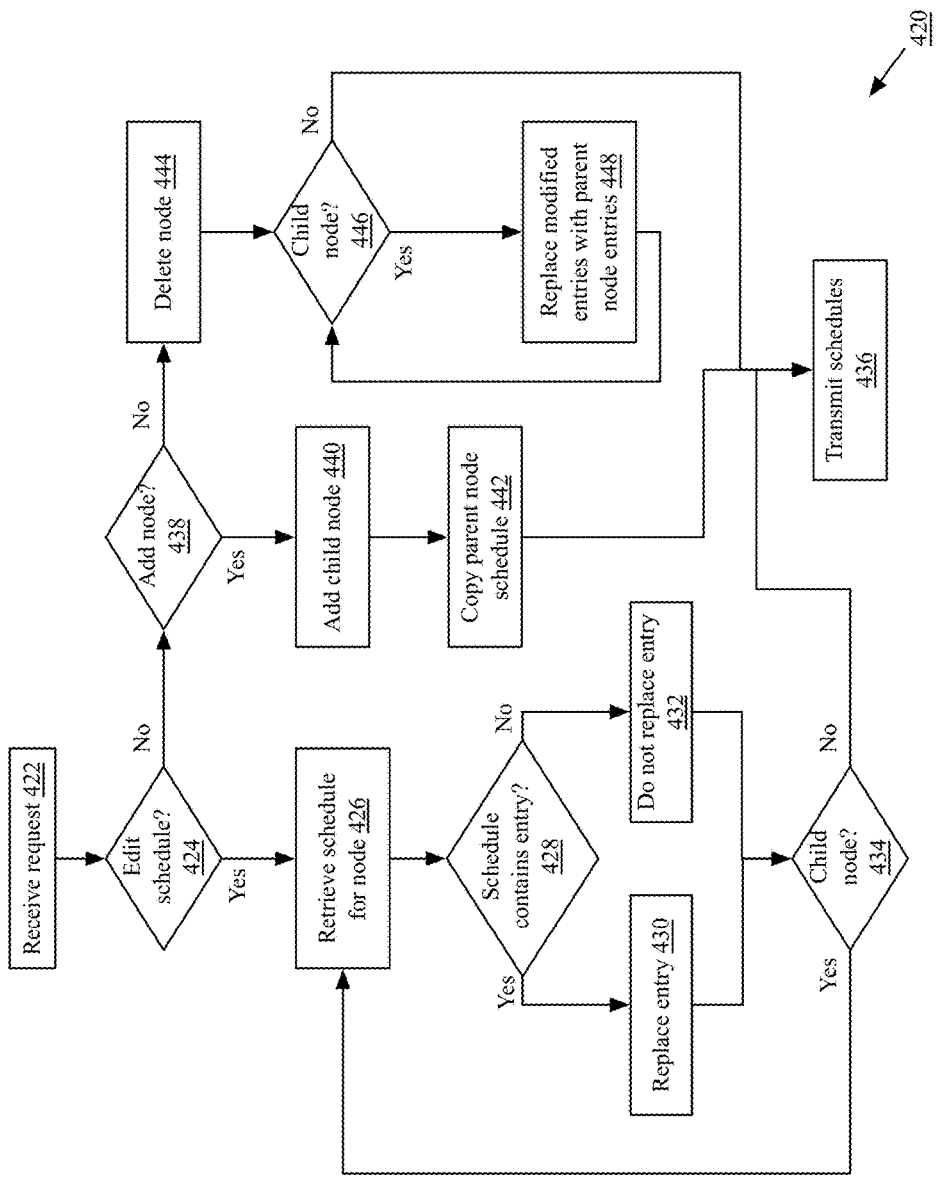
FIG. 4B is a flow diagram of an embodiment of a method for propagating edits in a hierarchical media automation schedule.

FIG. 4B is a flow diagram of an embodiment of a method 420 for propagating edits in a hierarchical media automation schedule. At step 422, a device, such as a management server, cloud server maintaining a hierarchical automation schedule, production server device, or other such device may receive an edit request for the media automation system. The request may be transmitted via any system discussed herein, such as via RESTful requests to the automation service via a web-based application, standalone application, or other interface. In some implementations, the request may include an identification of a node in the hierarchy corresponding to a broadcast region. The node may be a top level node, intermediate node, or child node in the schedule.

At step 424, the device may determine whether the request is a request to edit a schedule. In many implementations, the type of request may be explicitly identified, such as via an API or command to edit the schedule. In other implementations, the type of request may be implicit, such as by inclusion of an automation command or identification of an item of content and an execution or playback time, to indicate that the request is an edit request. The request may include a request to add an entry to a schedule and may include a time for the entry to be added; may include a request to delete an entry from a schedule and may identify the existing entry or time of the existing entry; or may include a request to replace an entry in a schedule and may identify the existing entry and/or time and the replacement entry. Each entry may include automation instructions, identifications of content to be played such as file names or locations or sources, router operations to be performed, or other such information.

If the request is a request to edit the schedule, then at step 426, a media automation schedule may be retrieved for the identified node. In some implementations, a single hierarchical schedule may be retrieved and a subset corresponding to the identified node may be identified, while in other implementations, each node may have its own differential schedule. The schedule may be stored locally in a storage unit of the device, or may be retrieved from a remote storage device or service.

As discussed above, in some implementations, the request may be to delete or replace an existing entry in a schedule. At step 428, the device may determine if the retrieved schedule for the node includes the existing entry. For example, in some implementations, the request may include a time of the entry to be replaced or deleted, and the device may determine if an entry exists at a corresponding time in the automation schedule for the node. In other implementations, the request may include a new automation entry and time, and the device may identify whether the schedule already includes a corresponding entry (e.g. at the corresponding time).

If the retrieved schedule includes a corresponding entry, then at step 430, the existing entry may be deleted or replaced with the new entry identified in the request. In some implementations, deleting an entry may be performed via a similar operation to replacing an entry, by replacing the existing entry with a new, blank entry. If the retrieved schedule does not include a corresponding entry, then at step 432, then no edits may be made to the retrieved schedule. For example, if the request identifies to replace entry "A" at time t with entry "B", and the retrieved schedule includes entry "C" at time t, then in some implementations, no edit may be performed. In other implementations, the request may indicate to remove all regional customizations at a specified time, and any entries at the corresponding time may be removed. In other implementations in which the request is to add an entry, step 428 may be skipped and step 430 performed with the new entry identified in the request.

At step 434, the device may determine if any child nodes of the retrieved node exist in the hierarchy. If so, then steps 426-434 may be repeated for the child node, and iteratively, for any further child nodes of said child node. Accordingly, edits to the schedule may be automatically propagated from a selected node through to every child node of the selected node.

At step 436, in some implementations, the edited schedules may be transmitted to one or more devices corresponding to broadcast regions. As discussed above, aggregated sets of automation instructions may be provided to the devices in some embodiments, while in others, the hierarchical automation schedule may be provided to the devices for aggregation.

If the request is not to edit an existing schedule, then at step 438, the device may determine whether the request is to add or delete a node to the hierarchy. In some implementations, the request may be explicit, identifying addition or removal of a node, while in other implementations, the request may be implicit and identify modification of a schedule for a not that does not yet exist, implying creation of the node.

If the request is to add a node, then in many implementations, the request may include an identification of a parent node. A child node of the identified parent node may be added to the hierarchy at step 440, and at step 442, an aggregated schedule may be created for the child node, comprising a copy of the parent node's schedule. In implementations using differential schedules, the child node schedule may be blank, indicating no changes from the parent node schedule. In some implementations, the resulting schedule may be provided to a play out device at step 436; while in other implementations, the node may be a virtual node and may not correspond to any individual devices. In other implementations, the request may not identify a parent node. In such implementations, the device may add a new top level node, and may skip step 442.

If the request is to delete a node, then at step 444, a node identified in the request for deletion may be deleted from the hierarchy. In some implementations, deletion of the node may include editing a directory of the hierarchy to remove the node and any sub-nodes of the identified node. In other implementations, deletion of the node may result in any sub-nodes being made sub-nodes of the parent of the deleted node, and any modifications made to the schedule for the deleted node being undone. For example, given a national network feed; East coast region and West coast region virtual child nodes; and further child nodes corresponding to individual cities on each coast, a new Northeast region virtual node may be created within the East coast region and one or more city nodes moved to be children of the newly created virtual node. An automation schedule for the new Northeast region may be modified to include breaking weather reports regarding an upcoming storm. Such modifications may be propagated to each city node that is a child of the Northeast region virtual node, modifying local automation instructions for devices corresponding to each city with a single edit per entry. Once the event is over, the virtual node for the Northeast region may be deleted at step 444. The system may identify any modifications in the schedule corresponding to the deleted node, and may undo the modifications to the child nodes by copying a corresponding entry from a schedule of a parent node (e.g. the East coast region virtual node) to the child nodes. The child nodes may then be restored to their prior position in the hierarchy as children of the parent of the deleted node.

Accordingly, in one such implementation, the device may determine if any child nodes of the deleted node exist at step 446. If so, then at step 448, any entries in a schedule of a child node that correspond to entries in the schedule of the deleted node may be replaced with corresponding entries from the schedule of the parent of the deleted node. The child node may then be made a child of the parent of the deleted node. Steps 446-448 may be repeated for each child node, and the resulting schedules may be provided to the child nodes at step 436.

Figure 5:
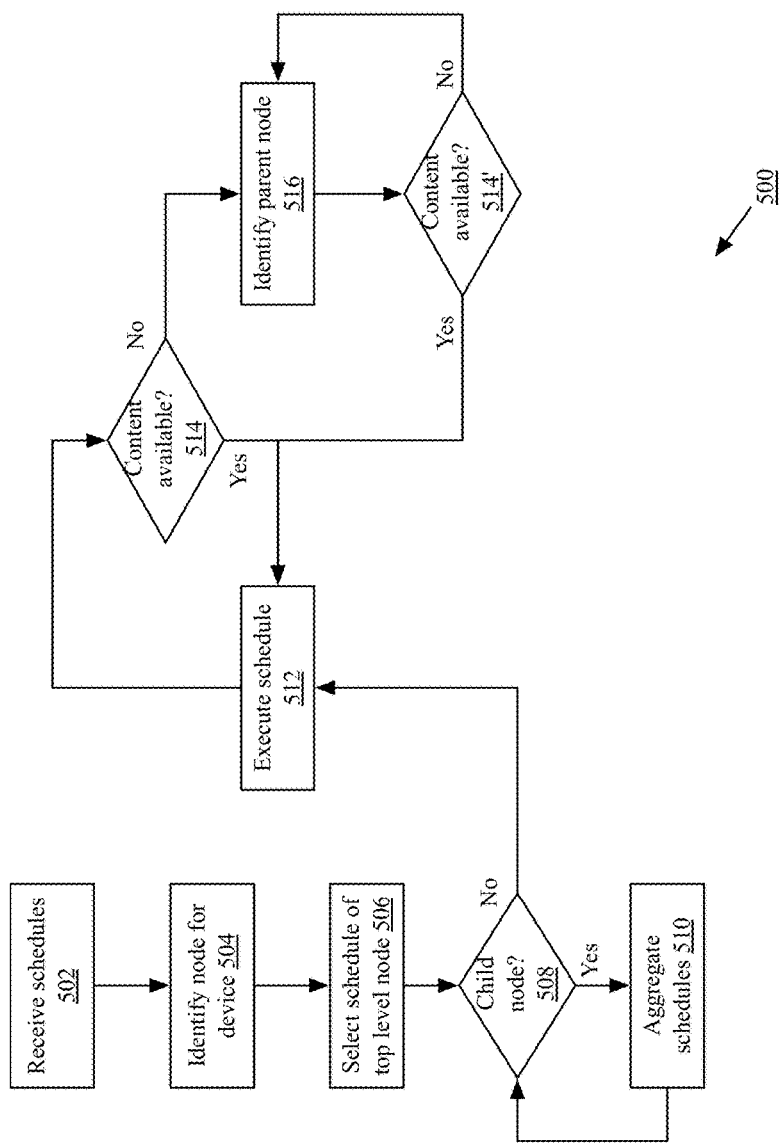
FIG. 5 is a flow diagram of an embodiment of a method for cloud-based media play out to a region.

As discussed above, by providing the hierarchical schedule to a client device, the client device may utilize greater intelligence in recovering from errors, such as when content is not available. FIG. 5 is a flow diagram of an embodiment of a method 500 for intelligent cloud-based media play out to a region. At step 502, a media play out device, such as a play out server, automation server, single card server, or any other such device discussed herein, may receive a hierarchical media automation schedule provided by a first device, such as a cloud-based NOC or automation and/or content server. The schedule may be "pushed" by the cloud-based NOC or transmitted responsive to creation or modification of the schedule, or may be "pulled" or retrieved by the play out device, either on initialization or periodically. The schedule may be delivered via a network, as ancillary data on a media stream, via email or file transfer, or any other such method.

At step 504, the media play out device may identify a node in the hierarchical schedule corresponding to the device. Identifying a node corresponding to the device may comprise identifying a node corresponding to a broadcast region including the play out device, a node with an identifier corresponding to the device, a node named for the device, or any other such method.

At step 506, the media play out device may select a schedule of a top level node of the hierarchy including the identified node for the device, such as a schedule for a node corresponding to a national feed. At step 508, the media play out device may determine whether the hierarchy includes a child node in the path from the top level node to the identified node for the device (e.g. the identified node or one or more intermediary nodes between the child node and the top level node). If so, at step 510, the media play out device may aggregate the schedule of the top level node and the child node, modifying the top level node schedule with any changes in the child node schedule. Steps 508-510 may be iteratively repeated for each intermediary node and for the identified node for the device to generate an aggregated schedule for the identified node for the device, comprising the top level schedule modified iteratively with each schedule modification of any intermediary child node or nodes and the identified node for the device. At step 512, the resulting schedule may be executed, with the media play out device controlling routers, graphics generators, mixers, play out applications or decoders, or any other such devices or applications according to the aggregated schedule.

As discussed above, in many implementations, content may be obtained from the NOC or content storage cloud service by the media play out device, either for playback via a live stream or for storage and subsequent playback. However, the content may not always be available when it is required according to the media automation schedule. For example, streaming feeds may fail, satellite decoders may break, producers may miss upload deadlines, etc. At step 514, the play out device may determine if an item of content called for by the automation schedule is available. For example, the device may monitor incoming media streams prior to executing a switching command to control a router or switcher to place the stream on air, or the device may attempt to load a media file in storage prior to playback of the file at an automation-specified time.

If the content is not available at the required time, then at step 516, the play out device may identify a parent node in the hierarchical schedule of the identified node for the device. At step 514', the play out device may identify whether an item of content called for in the schedule for the parent node is available. For example, if the aggregated schedule calls for content "A" at time t and the content is not available at step 514, then the media play out device may identify a parent node schedule that calls for content "B" at time t and determine at step 514' whether content "B" is available. In many implementations, the content for the child node may be a media file that must be transmitted to the media play out device while the content for the parent node may be a network feed. Accordingly, the network feed is likely to be available, even if the specified file is not.

As shown, steps 514' and 516 may be iteratively repeated for one or more parent nodes (e.g. a parent node, a grandparent node, a great-grandparent node, etc.) until a different item of content is specified and available. As discussed above, in many implementations, the hierarchical automation schedule may comprise a differential schedule in which a child node schedule is identical to a parent node schedule any place the child node schedule is blank, and only include any modifications specific to the child node schedule (or any further children of the child node). Accordingly, in such implementations, if an item of content specified for playback at a time t is not available, then the media play out system may simply traverse up the hierarchical tree until identifying a schedule of a parent node that includes an entry at time t. Such entry may be either in the initial, top level schedule (if there have been no other modifications), or may be a modification specific to a sub-region including the device. If the content identified in the entry is available, then the item may be played according to the schedule at step 512, as it is likely appropriate for the media play out device. For example, if the media play out device corresponds to a local broadcast affiliate and a local commercial is not available, then the media play out device may identify a regional commercial specified in a parent node schedule, the region including the local affiliate. The regional commercial may be aired as it is likely to be more appropriate to the local affiliate than a corresponding national commercial. Thus, a lightweight hierarchical automation schedule may be provided to media playout devices, allowing intelligent and automatic error recovery or backup selection.

Figure 6A:
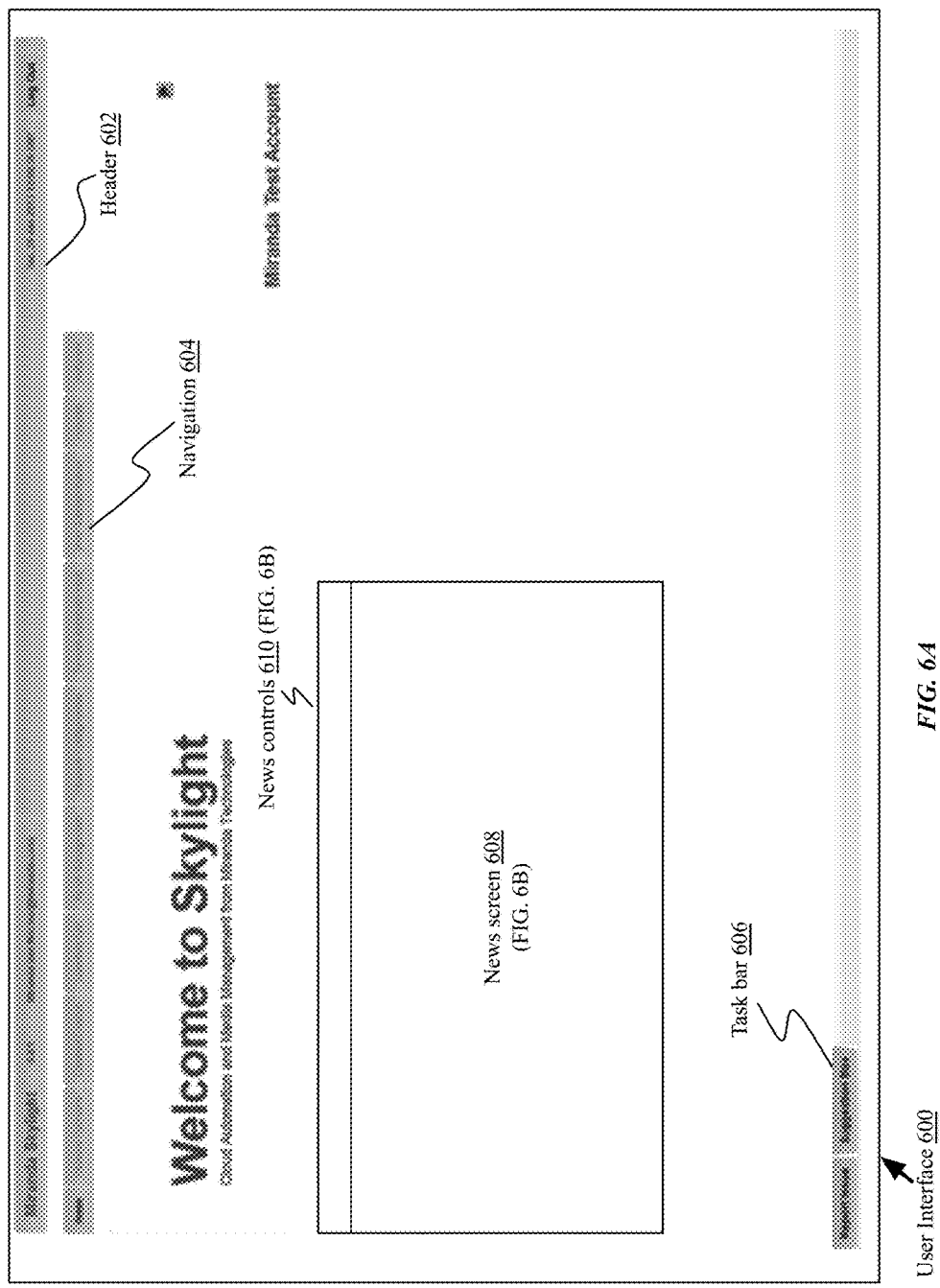
FIGS. 6A-6O are screenshots and diagrams of exemplary implementation of a user interface for content delivery management.
Figure 6B:
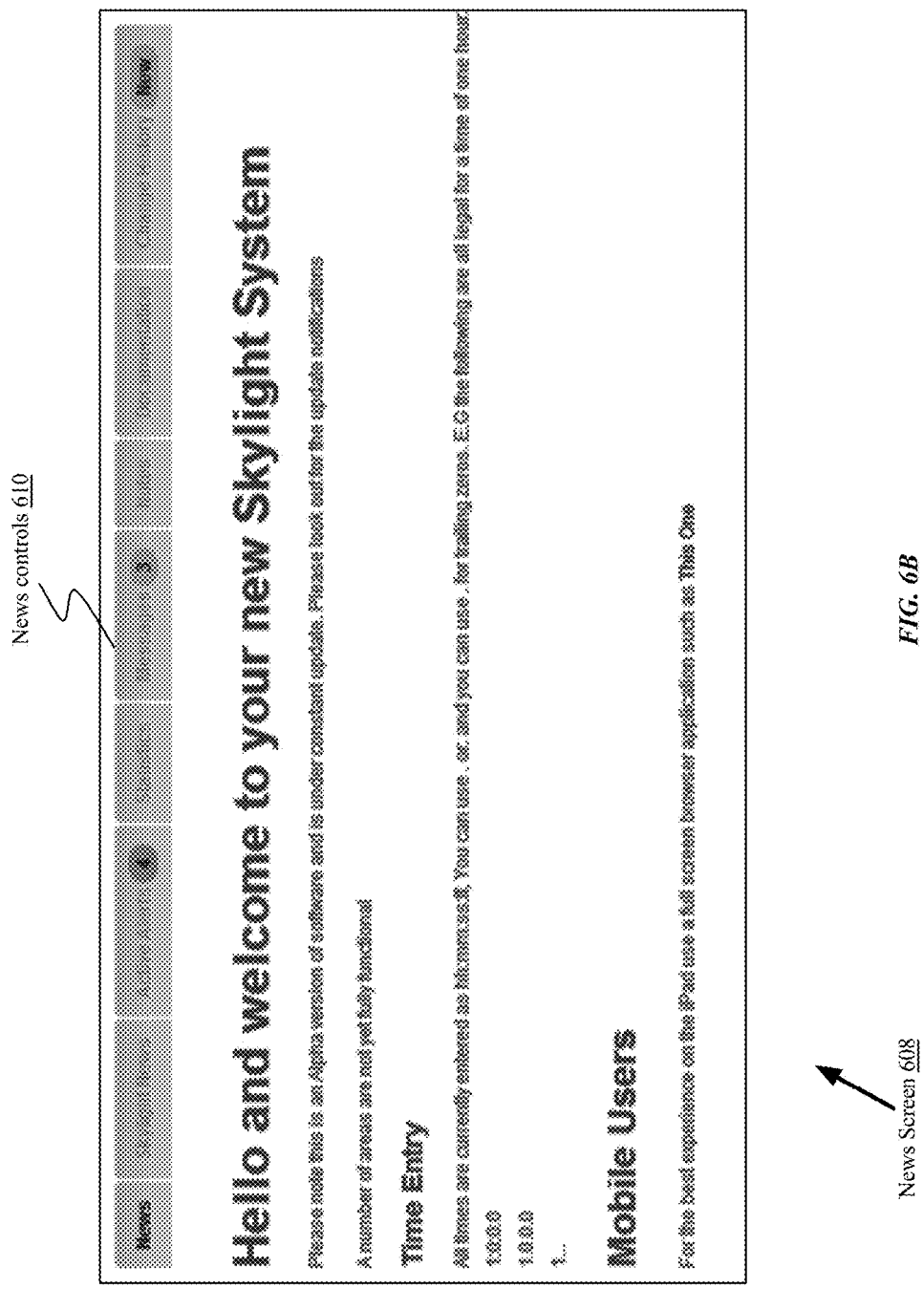
Figure 6C:
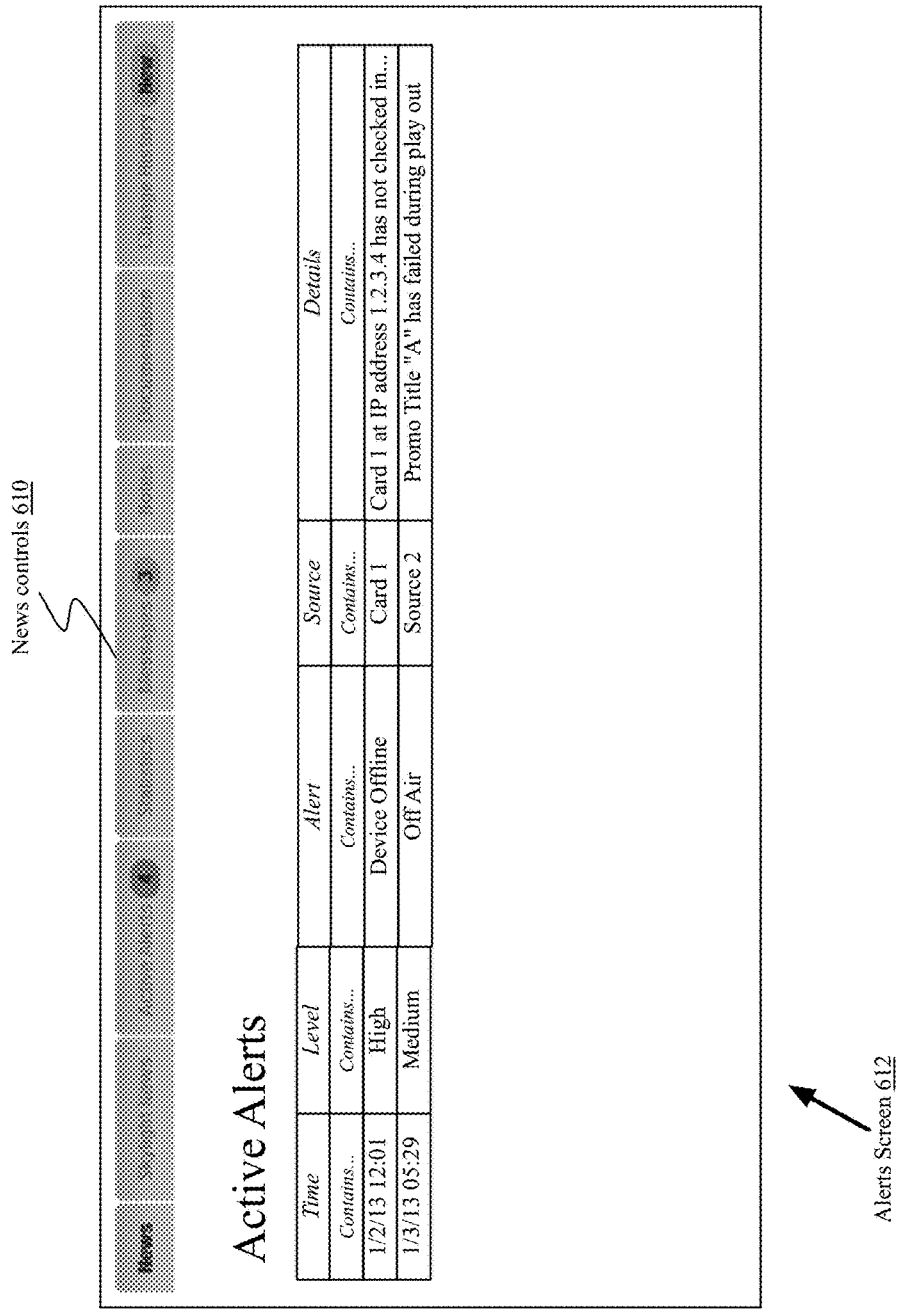
Figure 6H:
Figure 6H:
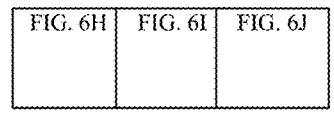
Figure 6I:
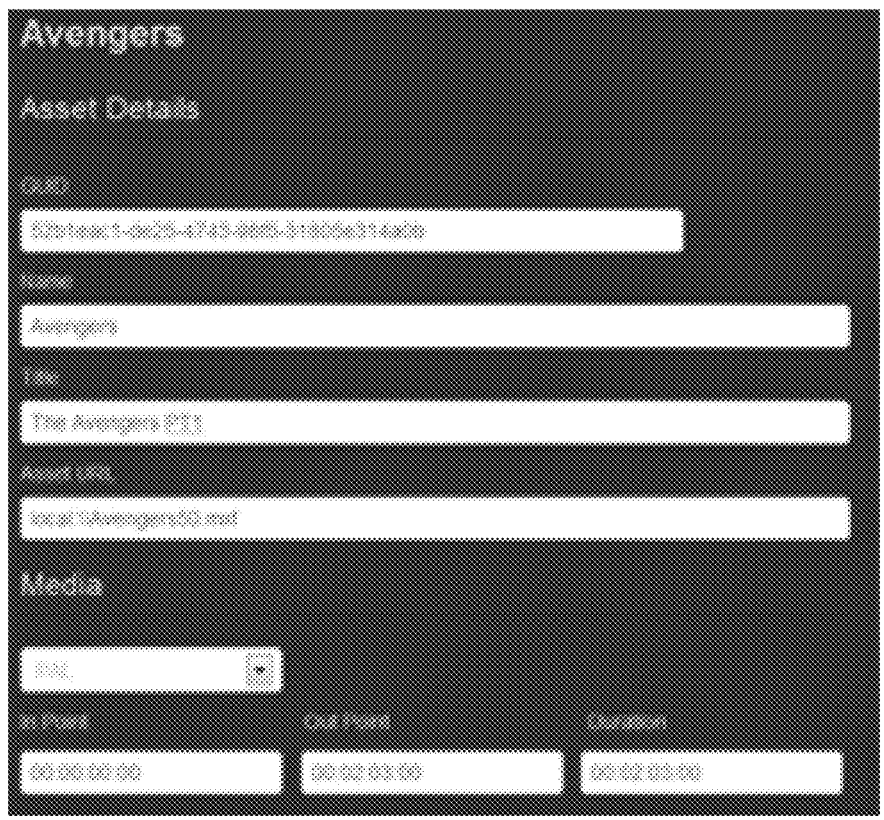
Figure 6J:
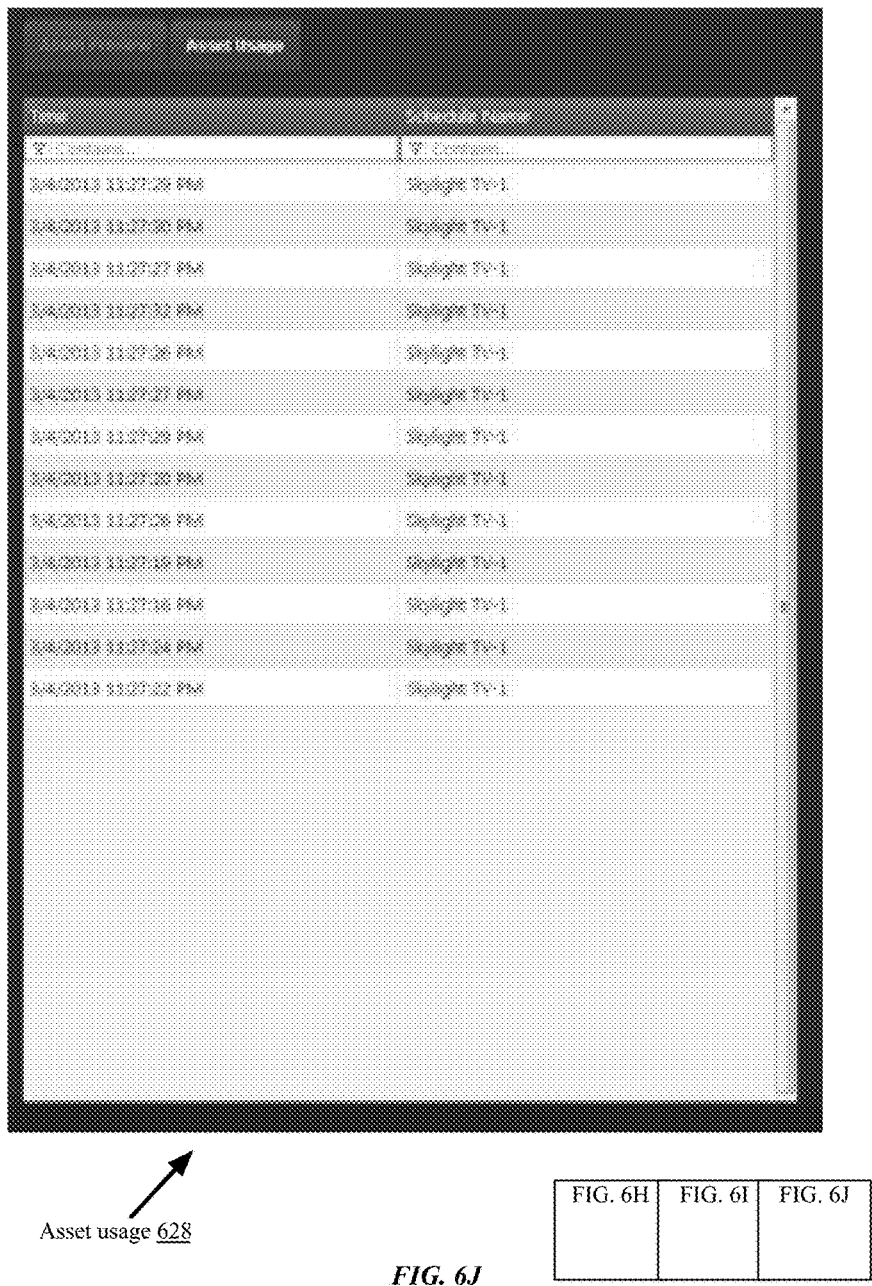
Figure 6K:
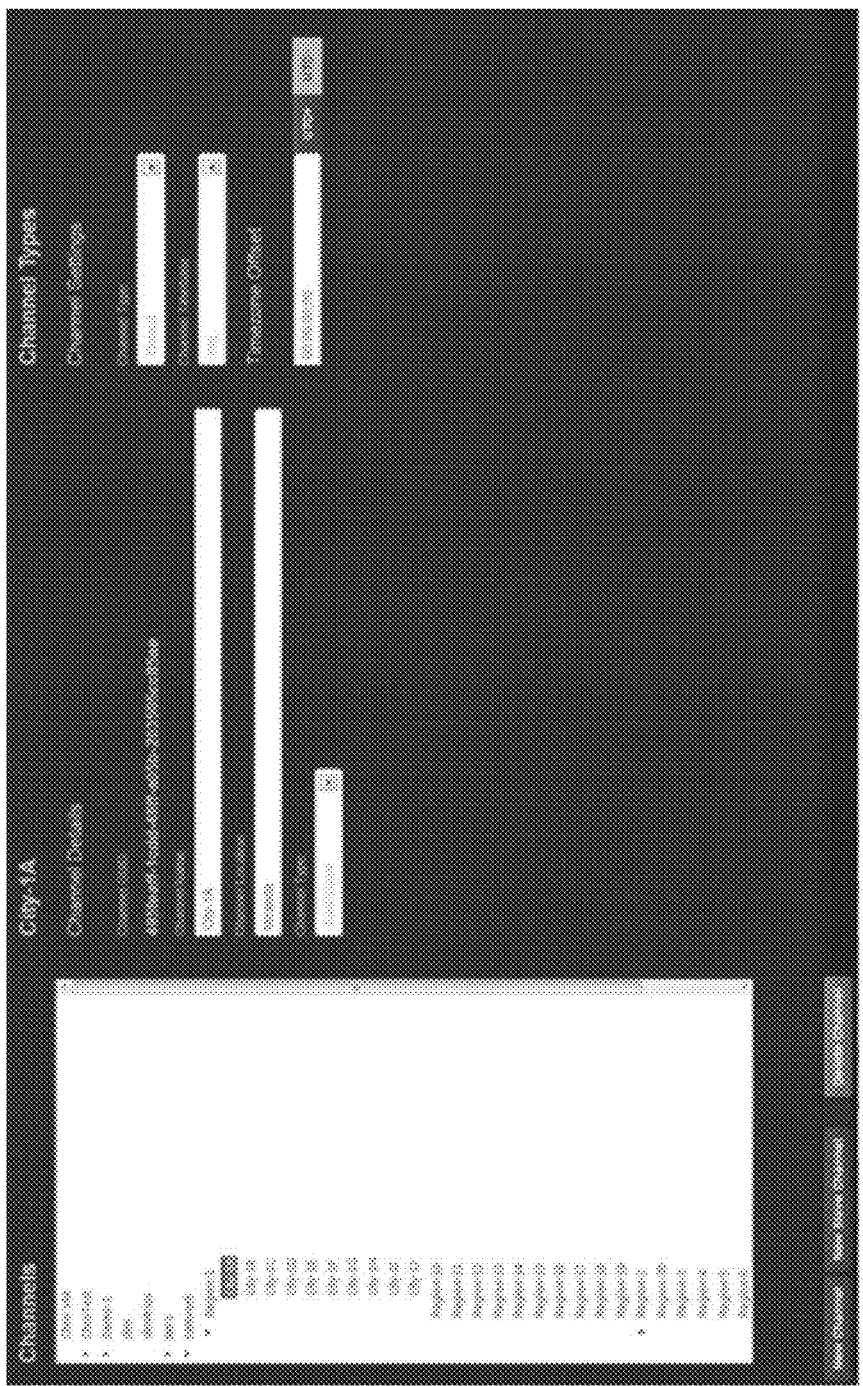
Figure 6L:
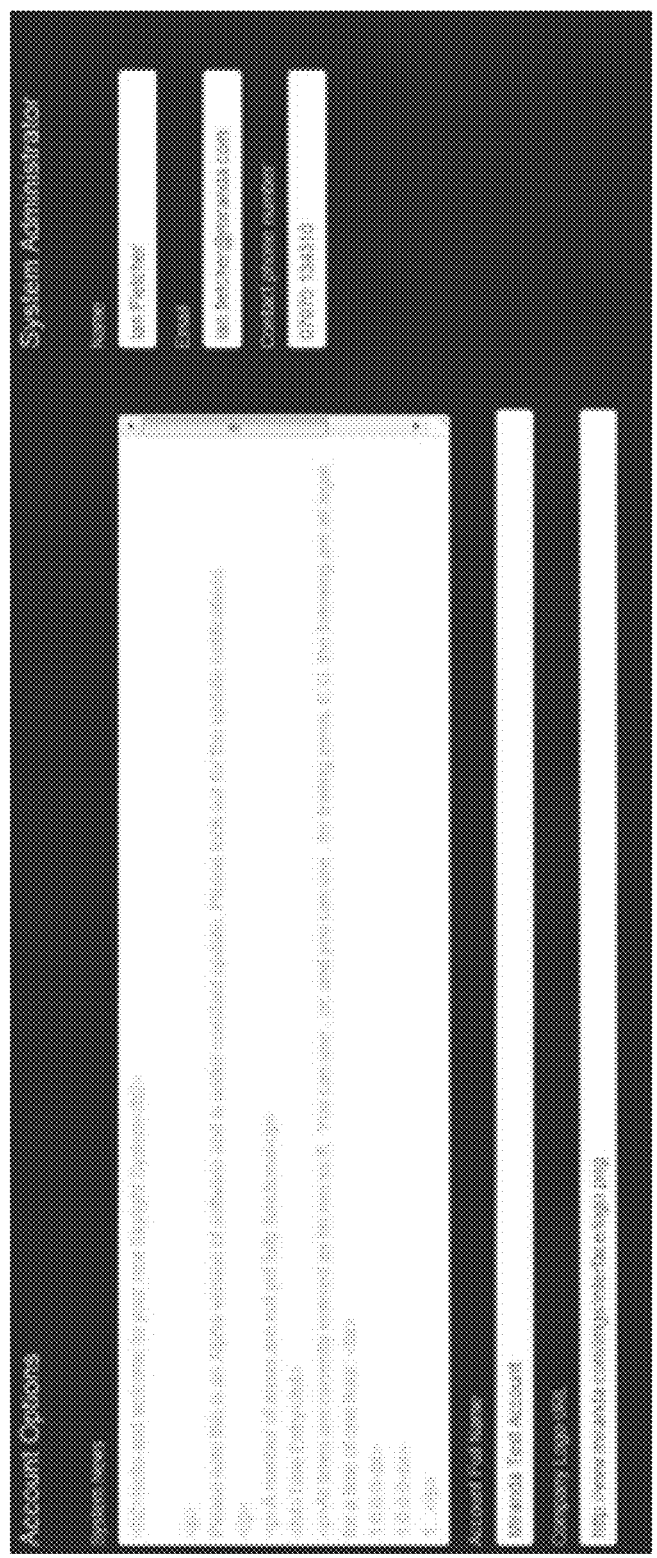
Figure 6M:
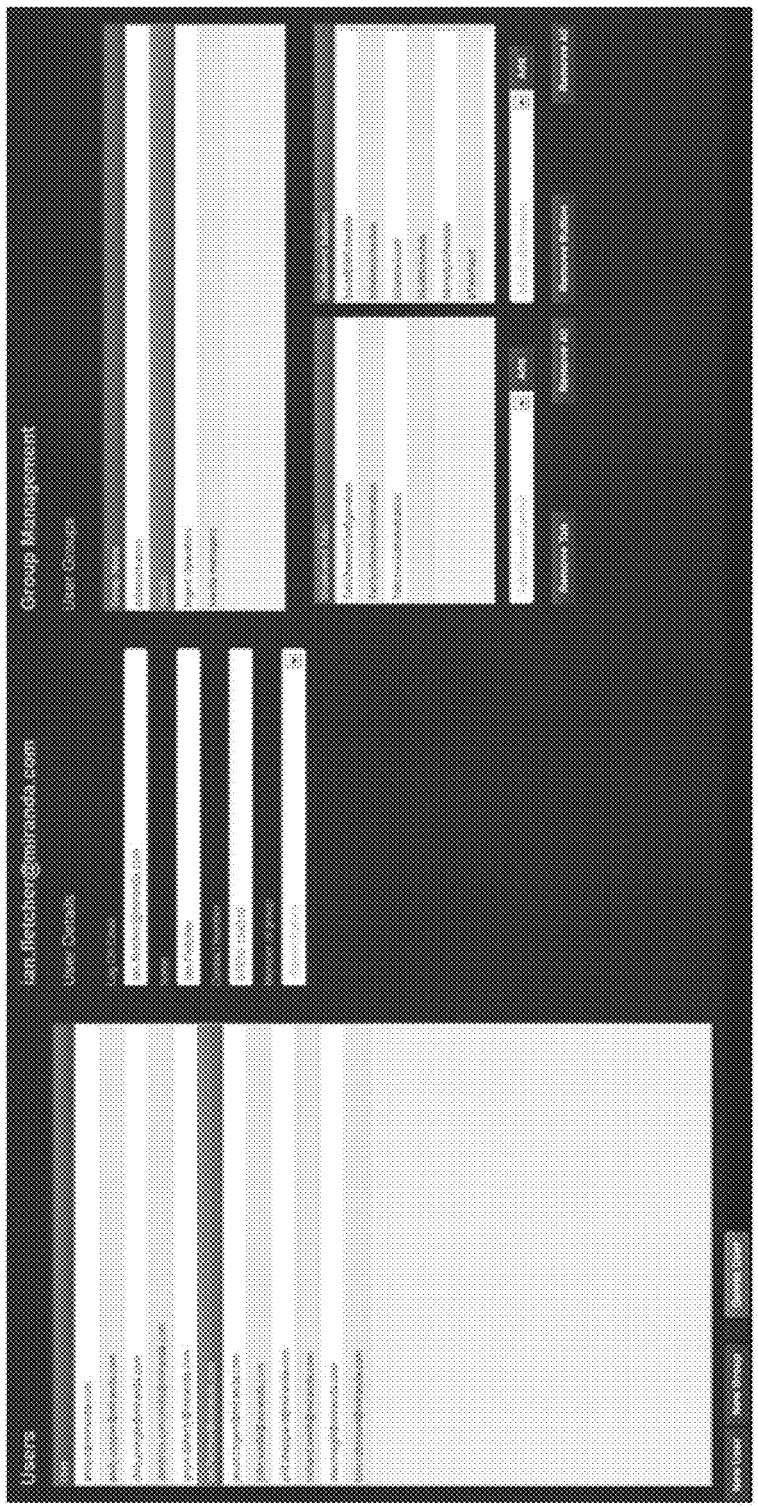
Figure 6N:
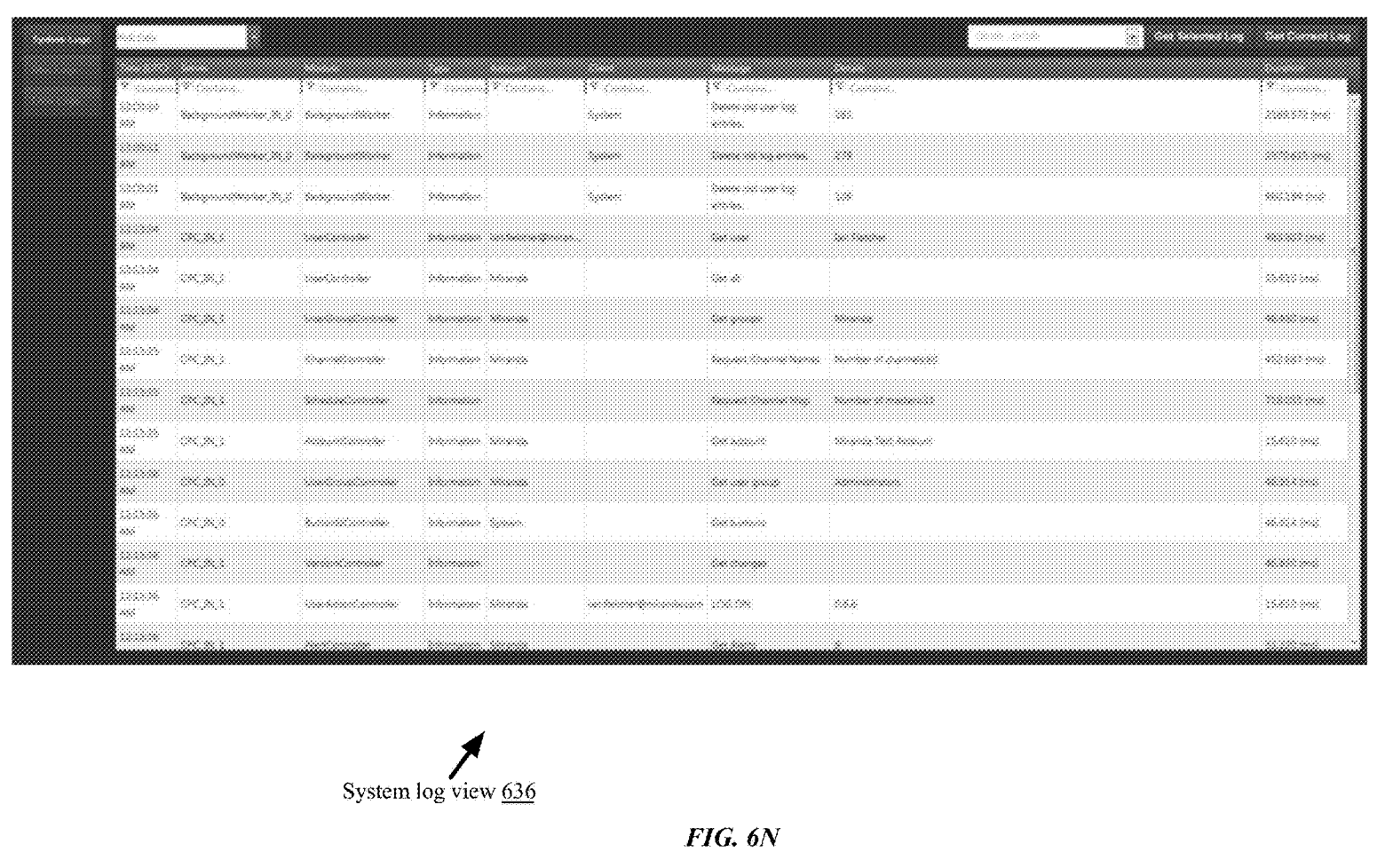
Figure 6O:
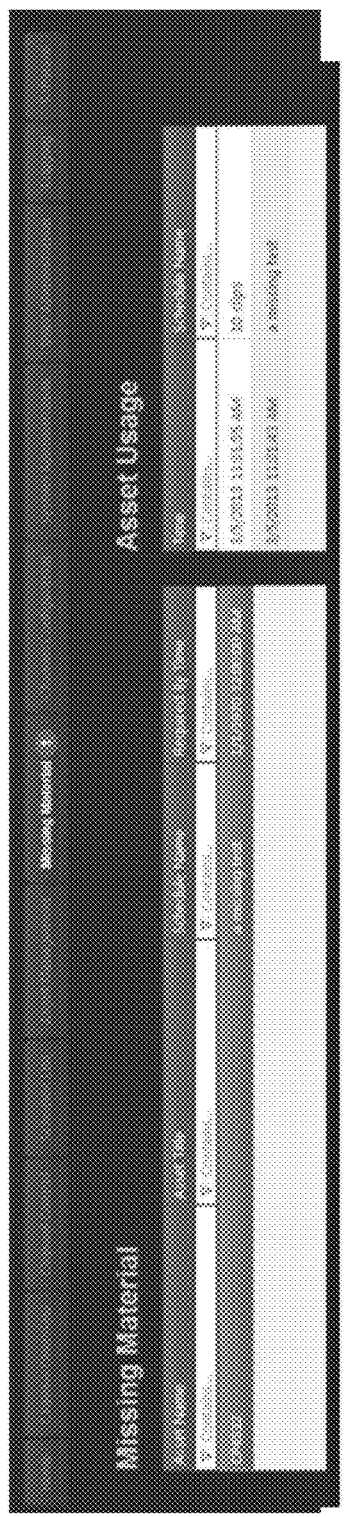

Referring now to FIGS. 6A-6O, illustrated are screenshots and diagrams of exemplary implementation of a user interface for content delivery management. The user interface may be provided by a server maintaining cloud storage, and/or may be provided by a web server executed by a playout server as discussed above. The interface is a platform independent web application, and can work at different resolutions and uses a dynamic flow layout so that the display formats to the target screen resolution. While designed for modern high resolution displays, it may also be used on smart phones, tablet computers, netbook computers or laptop computers, or any other type and form of computing device. Once the client is loaded, no further web page refreshes are required. Navigation between tabs and menus within the application is instant and data is not lost, even if the user enters data on one screen and then switches briefly to another to check something. In many embodiments, the user interface may be provided in a common language, such as HTML5 or JSON, though other interfaces may be employed, including Flash. In still other embodiments, client devices may execute native applications to communicate with the web server and display the user interface. For example, in one implementation, a client device may execute a standalone application for controlling play out servers, rather than a web browser. This may be useful for transmission critical or secure areas where an administrator may not wish to provide users access to other websites. Additionally, in many implementations, client application 755 may provide dedicated controls, keyboard shortcuts, or other interfaces for live control, including control via external hardware interfaces such as switch panels or triggers, console switch triggers, etc.

As shown in FIG. 6A, the user interface 600 may be divided into a number of sections that may remain consistent throughout the application, including a header 602, navigation bar 604, central area (e.g. screen 608 and controls 610), and a task bar 606. The header 602 may show the current software version as well as whether any new versions are available. If so, the user may click a button to download a new version, and then may re-log on to the interface to use the new version. Changes may be displayed via a software history view, discussed in more detail below. The header 602 may also show the user name and account of the user. The center section of the header may be used for notifications. Notifications are designed to prompt the user that something has happened on the system such as an alert going active or a new message being received. The message may be displayed for 30 seconds before fading out, while a number may be displayed to indicate the number of notifications the user has had since they last looked at the notifications. Clicking on this number will list all the notifications and the time they were received. The user may choose to keep them in the list or close the dialog and remove them all.

The header 602 may also shows the current client's clock, which should ideally be synchronized to an NTP time source so that schedule countdowns are accurate. This is especially important if the client is being used to trigger manual events operations in the playlist such as Take Next as the messages are time stamped, so the client needs to have an accurate local time reference.

One of the biggest challenges when investigating issues is the difficulty of getting detailed information on the time and specific alert effected by the problem as this is often reported well after the original problem and therefore cross-referencing back into the logs can be a time consuming exercise. To simplify this process and also give users a mechanism of giving direct feedback to administrators, a report issue button may be available on the header bar 602.

When this is selected, a dialog may be presented allowing the user to enter details of the incident. Ideally, the user would do this as soon as possible as this would capture a lot of information automatically such as the channel and the time as well as software version and user details. If the problem involved a specific item in the playlist, the user may select the item first either in the live list or in the history, as this will also automatically capture the GUID for that item so it can easily be identified in the logs.

Issues reported in this way are initially kept within the customer's account so they can be reviewed and investigated by the customer's own team before being submitted to customer support of the manufacturer or service provider for further investigation. However, in some embodiments, if an item is marked as critical, it may be sent directly to customer support of the manufacturer or service provider and email alerts sent to key staff in addition to the customer's own nominated email list.

Additionally, in order to aid reporting and issue investigation, customers are encouraged to have staff log on with their own email credentials. A Log Off button is provided to enable a user to log off once they leave their position. This also prevents unauthorized users from playing with the system. Logging off does not quit the application but simply returns it to the Log On screen.

The navigation bar 604 allow navigation between different screens of the user interface. Tabs may be available or not available based on user permissions—for example, user permissions for a producer may be limited to not allow channel configuration, system administration, or user administration. Tabs may include a home tab; a channel overview; a channel control; a schedule edit; an asset management tab; a channel configuration tab; a system administration tab; a user administration tab; a logging review tab; and a software history tab.

Task bar 606 may be displayed at the bottom of the screen in a consistent position on each tab, to provide a consistent and intuitive user interface. Tasks may be different for each screen. In some cases, task bar buttons may be single click buttons, toggle buttons, or open menus of additional options.

As shown, the user interface 600 may first display a home screen with a welcome message, customer configurable logos or messages. A news screen 608 may be displayed initially. Referring to FIG. 6B, the news screen 608 may include customer specific information set by an administrator, and may provide a set of subtabs or controls 610, including system news, alerts, statistics, messages, notes, documentation, and a change history. Notifications may be displayed on these controls 610 including a number of unread alerts or messages or whether new changes have been made to the system.

As shown in FIG. 6C, selecting the alert tab may display an alerts screen with a table of active alerts by time, level, alert type, source, and details, and sortable or filterable by each column. For example, by selecting a filter button in the second row of each column, the user may enter one or more variables such as a date or source and display only corresponding alerts. In some embodiments, the filter logic may also allow exclusion, such that alerts corresponding to a filter variable may be hidden. Authorized users may cancel alerts to remove them from the list via a cancel alert button (not shown). Alerts may be shown in the notification area in header 602 as discussed above, and/or may be emailed or otherwise transmitted to one or more users.

A statistics screen (not illustrated) may display system health and account statistics, including availability, load, and latency of cloud storage or services; notifications of performance issues; and one or more graphs illustrating the performance of the system, including:

Number of items transmitted in previous 24 hours
Number of items that failed per day
Number of new assets per day
Total number of minutes transmitted per day
Number of seconds or minutes lost (if any) per day
Outage time presented as a % per day Graphs may be retained to view trends over a time period, such as 30 days. Daily statistics may be retained indefinitely so that yearly or monthly reports may be generated. In some implementations, daily reports with the above items may be emailed to users.

A messages screen (not illustrated) may provide an email-like messaging system for sending messages to other users or groups of users without leaving the user interface 600. The notes screen (not illustrated) may provide a text editor for allowing the user to create notes for themselves. Notes may be attached to messages in some implementations. The documentation screen (not illustrated) may display system documentation retrieved from the cloud servers, and may be displayed in a hierarchical tree of topics and sub-topics and a help document with embedded images and graphics and/or executable or interactive scripts.

A version history screen 614, shown in FIG. 6D, may display a detailed history of all software updates in chronological order, with changes characterized as bug fixes, modifications, or new features. The user may click on a version to show details, and click on a specific change to display a detailed description 616 of the change. The description may include graphics, screenshots, or interactive elements. In some implementations, the software update list may include a list of pending or planned updates, to allow users to prepare for or comment on upcoming changes. New release notes may be identified via a badge in the news controls bar 610. In some embodiments, a suggestion box (not illustrated) may be provided to allow users to submit suggestions or feedback to system developers.

The user interface may show a channel overview screen (not illustrated) with a high level timeline view of a group of channels. The channel overview may show all channels in the system or just a selected subset of channels via a view selector drop down menu or check list. The individual channels may be represented as blocks labeled with the channel name and highlighted in a color to indicate their status (e.g. green for on air, red for errors, etc.). If there are more channels or playlist items than can fit on the screen a scroll bar will appear. In some implementations, a user may zoom in or out to look at different amounts of time. Zoom levels may be indicated by the scale at the top of the screen.

The user interface may include a channel control screen, illustrated in FIGS. 6E and 6F (in many embodiments, the two screens shown may be displayed side by side). The channel control screen may show all channels in the system or just a selected subset. For example, as shown in FIG. 6E, a set of channels may be shown with names, locations, devices, and IP addresses in a table 618. The table may be filtered as discussed above. Buttons may be provided to show all channels or select a subset of channels via a view selector drop down menu or check list. Channels can be selected from the list by clicking on them or using the up and down arrow keys (once the grid has focus). A user may use the grid filters to reduce the list to specific channels by typing into the box at the top of the column to search on, as discussed above. For example typing city in the first column will reduce the list to only show channels with the word City in their name. By pressing the Channel Mapping tab, the user can see the channels represented in their hierarchy which makes navigating complex channel relationships easier. Additionally, task bar 606 may display channel-specific commands, such as edit schedule, append schedule, empty or clear schedule, and show history or the as played schedule.

As shown in FIG. 6F, once a channel is selected, the individual items in a playlist for a channel may be represented in rows in a table on schedule screen 620 with a color to indicate their status:

Green—On Air
Red—Missing
Yellow—Cued
Dark Yellow—Cueing
Grey—Done
Bright Red—Off Air
White—Ready
White—Available
Red—Inaccessible The channel grid can be scrolled using the scroll bar or the up down arrow keys. You can filter the list to only show specific items by typing a search string into the column header. For example to quickly check a long list for missing items just Type Missing into the status column header.

The channel name may be displayed at the top of the screen, along with details of whether it is a slave or master in the hierarchy. A confidence monitor may be displayed (e.g. color bars or the output from a channel) showing the stream from the monitor proxy of a playout server. The interface may include buttons to select a logo for the channel from a range of preconfigured logos for the channel, and the on and off buttons may be used to control keying of the logo by the DSK modules of the playout server. In one implementation, the logo on button will initially show orange to indicate that the user has pressed the button, and then change to green upon receipt of a tally or acknowledgement from the server playout device. In some implementations, if the channel has children, the logo control may operate on all of the sub channels at the same time. In a further implementation, although the on/off button may apply to all of the channels in the hierarchy, each channel may display only its own selected logo. This allows universal keying with station-specific logos. The schedule screen may also include a now/next display showing the current on-air item, its elapsed time, the next item, and a countdown to its on air time.

Channel control tasks shown in the task bar 606 (some of which may be shown in the portion of task bar 606 displayed in FIG. 6E) may include:

an edit schedule button for accessing the schedule edit screen 622, shown in FIG. 6G and discussed in more detail below. Via the edit screen 622, which may appear as a popup or overlay or may be presented adjacent to the schedule screen 620, a user may make edits on either a live schedule, or a schedule in the database and selected via a list (not illustrated), which may include a search or filter box for quickly searching for a schedule by typing all or part of the name. Schedules do not need to be explicitly saved, as all changes are committed immediately to the database in many implementations. In other implementations, versions may be maintained locally and manually committed, or a change tracking and versioning system may be implemented.

an append schedule button for adding a schedule to the channel. In some embodiments, selecting the button may cause the user interface to display a pop-up or overlay list of available schedules in the database (not illustrated), along with a search box for searching or filtering a schedule by name or a portion of the name. Once a schedule is selected for appending, the channel schedule screen 620 may be updated with the additional items. In one embodiment, if the appended schedule starts with a fixed time that would cause a significant overrun with the current running schedule, the first event may be changed to auto-start.

an empty channel button for deleting all events from the channel and stopping playback of the currently running clip in the playout server. In one embodiment, to prevent accidental deletion, a CAPTCHA or random number is displayed that the user must enter to verify that the schedule should be emptied.

a show history button for toggling the schedule between the running schedule and the as played history for the channel. The history shows all items that have played on that channel for the current schedule day.

a bypass/return button for switching the playout server into manual bypass or routing its video input to its output, while leaving the schedule running in the background. This may be used to return to a live network feed for a breaking news event. While the device is in bypass mode, it may send a status update of "bypass" for the current item and following items until the return is executed, for proper traffic updating. Return may cause the playout server to return to a currently playing event using a join-in-progress transition, while a take next command may cause the device to come out of bypass and begin playing the next cued event.

live channel controls including cue next, take next, hold next, and drop next, as well as an arming "control channel" button. In order to use the live controls, the user must first select the control channel button to take control of the channel. In some embodiments, the other live controls may be hidden until the control channel button is armed. Only one user may control a channel at a time in most implementations, and other users may be notified that the user is controlling the channel.

The cue next command issues a cue message to the device to prepare the next event. This needs to be done before the take next command can be executed. Once the item is ready, its status will change to cued, and the cue next button will light up green.

A recue command forces the currently playing clip to recue back to its in point and go into hold, allowing the item to be started again with a take command.

The take next command instructs the device to play the next event. The button will be lit up red when the next event is cued and ready to be taken. Pressing the button when it's not active will issue a take when ready instruction to the device which will cause it to first cue and then play as soon as it can.

The hold next command puts the channel into hold which has the same effect as setting the next item to manual. This can be executed up to 2 seconds before the item is due to go on air. The behavior of the current on air item depends on its type: in the case of a live event it will carry on, while in the case of a clip it will freeze on its marked out point even if there is more media beyond that point. This behavior can be overridden on specific items if required using the event options in the playlist.

The drop next command provides the ability to quickly drop the next item from the playlist. This may be equivalent to selecting an item and removing it. If the next item is already cued, then the item after next will then cue instead.

Other commands may be available, including commands for breaking away to another feed or source and returning, enabling or disabling graphics or logos, or controlling downstream keyer resources.

Live audio controls may be displayed in a sub-panel (not illustrated), which may provide a number of features for adding voice inserts. These can be pre-recorded announcements or may cause the playout server to select the live AES input to the device. An amount of background audio suppression can be configured for the background audio. In addition to the live input, the user can select from one or more user pre-assigned buttons or select a specific audio file from the asset library. However, if that file is not present on the device it will not be useable until it is cached, at which point the button will change from red to amber. For live or pre-recorded voice overs, the user can specify which of the 8 stereo output pairs they want the audio to play on. This may be useful for back channel foldback communications or cueing, or for remote monitoring or alternate language options.

SCTE104 triggers embedded in video may also be used to cue and take a playlist or item, as well as triggering network returns, as discussed above.

The schedule edit screen 622 may include a dialog for modifying item details as shown in FIG. 6G. In some embodiments, this screen may be displayed next to the schedule screen upon selection of an item, or may be displayed responsive to user selection of the edit schedule button. As discussed above, a user may make edits on either a live schedule, or a schedule in the database and selected via a list (not illustrated), which may include a search or filter box for quickly searching for a schedule by typing all or part of the name. Schedules do not need to be explicitly saved, as all changes are committed immediately to the database in many implementations. In other implementations, versions may be maintained locally and manually committed, or a change tracking and versioning system may be implemented.

The schedule edit screen 622 also allows viewing of a schedule as played or as run history. Past as run histories for previous days may be loaded as schedules. Although the histories cannot be edited, they can be viewed and copied or appended into live channels for testing or investigation of issues.

The schedule edit screen 622 may include a dialog or item editor as shown in FIG. 6G, which allows properties of a single item to be updated. Changing any of the properties on an item may display an Update Changes button which must be pressed in order to commit the changes. If the user wants to abandon the changes, they may click on another item in the playlist. The top third of the item editor shows the selected event ID and title, including the globally unique ID for the event. The middle section allows the item's time mode to be adjusted and preset time set. Over runs or under runs of fixed time items may be displayed with a plus or minus number indicating the size of the overlap. Time modes include:

Auto/follow on: the item follows directly from the previous item.

Fixed/True Time: the item starts at the time entered into the time/date fields. If this overlaps with existing items in the schedule, an over or under run amount will be displayed. Items in this mode may be indicated by an "F" before the time in the schedule grid, and/or may be shown in colored text.

Manual: upon reaching the item, the playlist goes into hold and waits for a manual take command. Items in this mode may be indicated by an "M" before the time in the schedule grid, and/or may be shown in colored text.

Start plus: for secondary events, the value entered into the time field may be applied as a starting offset from the start of the parent clip.

Start minus: similar to start plus, the value may be applied as a negative offset from the start of the parent event.

End plus: similar to start plus, the value may be applied as a positive offset from the end of the parent clip.

End minus: similar to start minus, the value may be applied as a negative offset from the end of the parent event. For example, if the user wants a logo to display 30 seconds from the end of a primary event, the secondary event could be set as end minus with a value of 00:00:30:00 in the time field.

Fixed end: this may be used to allow a variable element to expand or contract to fill a gap up to a fixed point. For example, if the user wishes a movie to start at 12:00:00:00 with a countdown element that counts down to the start of the movie, the exact amount of the countdown needed may vary based upon how the schedule changes earlier in the day. Instead of making the movie a fixed start, the user may set the countdown clock to be a fixed end with a time of 12:00:00:00. The clock's duration is automatically set to fill the gap between the movie and the end of the previous event. It also adjusts the in point of the clock clip so that it ends at the out point. Fixed end can also be used as a way of executing a join in progress in a situation where an extra item such as a news flash is inserted into the schedule. Instead of allowing the schedule to ripple, the user may select the item to join in progress and set its end time to be the required transmission time of the following event.

The lower section of the item edit dialog may change dynamically based upon the type of item selected in the schedule. For example, events and options may include:

VCHIP: allows the selection of a VCHIP code from a pre-set list of codes.

WSS: allows selection of a widescreen switching code from a drop down list.

AFD: allows selection of an active format description code from a dialog. The AFD may also be identified by a graphic showing its effect.

Live Events: allows selection of a playout server live input.

Comments: no impact on the playlist, but allow the user to enter information or break up the schedule with comments or visible highlighting.

Logos: logos can either be still or animated and may be stored in the systems as assets. The logo contains information about its position and type of animation (e.g 1 shot, cycle, or loop). Graphics may be imported using the asset management system discussed above, and cached to the playout server in the same way as video assets. Logos are short animations and not full screen as opposed to Graphics which can be any length. The Logo can be selected for one of 3 modes: On, Off and Duration.

Suppress Logo: Special schedule event that can be used to suppress any active logos that are on air at that time. When a suppress off is received the logos return to their previous state.

Graphics: A graphic can be thought of as a video clip with optional transparency that can occupy the full screen. A graphic would typically be created by an After Effects workflow and used for things such as schedule boards or snipes.

SCTE104 Trigger: Digital cue tones can be specified in the play list to trigger third party downstream devices, and the type of message and payload can be specified.

Voice Over: Allows for scheduling of audio files delivered as stereo WAV files. The level of background PGM can be ducked to a pre-set level when the event is active. Audio files can be selected to play on any of the playout server's output pairs.

External Voice Over: Fades up the external voice over input that is connected to the AES audio input of the device, and also fades down the background audio by a pre-set amount. Live voice overs can be selected to play on any of the output pairs.

GPO: Allows control of any GPOs available on the external device. The GPO can be selected from one of 3 modes: On, Off and Duration. In the case of duration the length of the event controls the length of the pulse.

External Key: Used to control the external key input to the edge playout device to allow the insertion of graphics from third party devices. The Key can be selected for one of 3 modes: On, Off and Duration.

News Flash: This is similar to a normal live event but is used where the user wants to insert a live event into the playlist in the middle of a clip and then return to the point at which the program left off. The news flash is inserted into the list after the item to break into. At a suitable point, the news flash item is taken to air manually using the Take Next command. Any remaining content of the prior item is automatically reinserted back into the playlist after the live event. The exact in point of the prior item can then be adjusted if required. Both the News Flash event and the item being re-joined automatically get a fade through black transition to soften the transition for the viewer, but the operator can override this.

Unknown Media: The unknown event type allows the user to insert into the schedule an asset that doesn't yet exist. Once the asset becomes available it will be replaced automatically and any timing adjusted.

Software Upgrade: Allows a device software upgrade image to be scheduled as a secondary event in order to automatically perform a software upgrade at a specified time. The user can select from a set of available software images and can either upgrade or downgrade using this mechanism.

Black Filler: Primary event to insert black into a schedule for the specified duration. The event could be as short as 1 frame.

For primary events, a transition selection dialog may be shown in the bottom part of the schedule edit dialog 622. The following transitions are supported:

Cut;
Mix;
V Fade;
Cut Fade;
Fade Cut; and
Cut through black/U fade.

In the case of a mix, the item is overlapped by the length of the mix, such that changing an item to a mix will change the timing of the playlist. In the case of a U fade, the transition duration controls the amount of black and also has the effect of gapping the playlist by that amount.

In some embodiments, an item preview tab (not illustrated) may be used with media events to show the poster frame of the video element and, if available, may provide a streamed proxy of the content that allows the content to be previewed from its marked SOM/EOM. The component can also be used to mark a new SOM/EOM.

The item notes tab (not illustrated) shows any notes associated with the selected schedule item. The operator can add additional notes. The item history tab (not illustrated) shows the history of the selected item, including both status changes and any changes made by the user. A history grid may be provided to show the time of changes, and in the case of user edits to the item, the user name.

Media content types such as programs, commercials, etc. can be defined in either the asset metadata or imported from BXF. Items may be subtly colored in the grid when they are in their ready or available state.

In the schedule edit window, the user may create a new schedule by selecting a new schedule command. The system creates a new schedule and prompts the user for a new schedule name. When a new schedule is created it is automatically loaded ready for use. The user may also delete a schedule to completely remove the schedule from the system; copy a schedule; empty a schedule without deleting the schedule; delete an item or block of items from a schedule; or append a schedule to a currently loaded schedule. The user may also replace an item in the schedule by selecting an item and clicking a replace item command button, which presents a sub menu to select the type of item that the user wants to use to replace the currently selected item. This allows clips to be replaced with live events or vice-versa. When the user replaces an item, the duration of the new item is used unless the user is switching a clip for a live event, in which case the original clip duration is preserved. Replacements are logged in the item history.

The user may also insert an item into the playlist before the currently selected item; append an item to the end of the schedule; and cut, copy, and/or paste an item or multiple items within the schedule or to a different schedule.

The edit screen may also provide a global search and replace dialog to allow the selection of a source and replacement clip to be globally replaced across the current or selected group of channels. Only the master channels are presented as options as any child channels would get replaced automatically.

In some embodiments, a count changes button is provided to show the number of events that will be replaced prior to the perform changes button being pressed.

The user interface may include an asset management screen, displayed across FIGS. 6H-6J. Assets may comprise media or content, clips, commercials, promos, stingers, snipes, logos, or any other type and form of asset. As shown in FIG. 6H, assets may be selected, searched and filtered as discussed above, as well as deleted from the database.

The asset usage or history tab 628 in FIG. 6J shows the last 1000 instances of this asset transmission history including the channel it was transmitted on. In particular, this tab shows a list of all schedules and times that this asset is currently used in, and includes live channels as well as schedules.

Assets are normally created from the station ingest system but there may be situations where a user needs to manually create an asset. This may be done using the new asset task. Any manually created assets may need to have their URL set to the location of the physical media, such as via asset detail editing screen 626 shown in FIG. 6I. In some embodiments, upon deletion of an asset, if the media is also being hosted in cloud storage, then the physical file will also be removed. If the media is hosted externally it will be left alone. Wipe lists may be used to delete large amounts of media from both the ingest system and the cloud storage system.

Channels may be managed via a channel management or configuration screen 630, as shown in FIG. 6K. This screen provides various management functions for the creation, deletion and configuration of channels. The screen is divided into 3 areas: the channel list, the channel details and a section to manage channel types. Rather than having to configure channels individually, the media distribution system uses the concept of channel types. A channel type is a collection of configuration settings which affect all channels that are configured to be of that type. If all of the channels need the same configuration then the user needs only set this once.

Initially all systems have a channel type called default and all new channels belong to that type. However, user may create a new type with different settings and assign that to the channels that share those different characteristics. Typically, only settings that are unique to the channel such as name, location and assigned device need to be configured on a per channel basis.

Channel configuration options include:
Time Zone Offset: Allows the entry of a time zone offset applied plus or minus from UTC.
Channel Offset: Allows the setting of the channel offset plus or minus from UTC. This affects the actual time that items play back relative to UTC whereas the time zone affects how numbers are displayed.
  For example, if a user is an East Coast broadcaster and wants to work in EST with a West Coast delay channel, they would set the time zone to −5 and their West Coast channel to an offset of −3. If they wanted to see their West Coast channel in local time, they would set the time zone to −8.
Channel Time base/Output Format: Allows setting of the timebase/output format that the channel operates in, which affects how the time code is represented on the screen. In many implementations, the system follows the convention of representing drop frame time code with a semicolon between the seconds and the frames.
  Changing the device output format will cause an immediate effect on air for all devices attached to channels assigned that channel type.
Media Group: Allows a channel to be put into a media group, which will restrict the media that can be played on the channel.
Off Air Behavior: Controls what the channel does in the event of an inability to play back a clip either because of a fault or missing material. Options include showing of an off air slide, a live source or playback of an evergreen episode.
Evergreen Content List: The edge playout device has the ability to insert evergreen standby content in the event of an item not being available in the schedule.
Media Persist List: Holds a list of assets such as video clips, logos and voice overs that the user wants to always be available on the edge playout device regardless of it being in the schedule.
Media Search Paths: Allows the configuration of one or more search paths to be used by the edge playout devices when looking for media on the local NAS. In addition to the path the domain credentials must also be configured—i.e. Domain; User Name; Password.
Channel Alerts: Allows configuration of the type and threshold setting for any alarms that can be generated by the channel. Possible alarms include: Off Air; Missing material; and Schedule Low.
Channel Logo: Allows a user to upload a small channel logo to be associated with this channel, and used on the channel overview and channel control screens to help identify the channel.
Maintenance Mode: Suppresses all alerts and notifications from this channel and stops any on air failures being reported in the daily statistics.

As shown in FIG. 6K, channels may be added as slaves, and may be displayed in a multi-level hierarchy or list on the left side of the screen.

A device management screen (not illustrated) may be used to manage the devices associated with the account. It may provide the ability to associate devices with channels, add new devices and remove existing ones. When a device is assigned to a new channel, it loads its schedule and starts downloading the content. Play-out will commence as soon as the first asset is available. An option is also provided to mark the device as being in maintenance mode which will prevent it from raising alerts and alarms as discussed above. The playout server can assign common settings to a channel type, and will have the effect of applying those settings to all other devices with the same channel type.

Playout servers devices can raise a number of hardware alarms and these are reflected in an overall health status for the device, displayed on the channel associated with that device. If the health status changes a system wide alert is raised. Alarm details may be shown in the alarm tab.

As shown in FIG. 6L, the system may include a system administration screen 632. This screen is usually only made available to system managers, and provides configuration of various global settings for the media distribution system, including setting system-wide news, which may include embedded links or images; account names; company logo URLs or the uploading of a logo, such as a PNG file with a transparent background; and administrator name, email and contract phone numbers.

As shown in FIG. 6M, the system may include a user administration screen 634. This screen is usually only made available to system managers and provides a number of functions around managing users and their allowed features within the system. The screen is divided into 3 sections: a user list, user details including which group they belong to, and a section to manage user groups.

Users may be added to the account by entering the email address they will use to logon with. User details can then be entered and the user group they belong to set. By default all new users are added in the Guest user group and so have limited access to the system. The administrator may assign the correct group once the user has been created. Users can be removed from the system using the delete user button.

Groups are used to create sets of features that an administrator wants to be available to a group of users, by restricting access to areas of the application. There are two levels of granularity for controlling access to the system: the simplest is to restrict an entire screen, by removing the tab from the navigation bar for the group; for more specific control, the administrator can disable individual buttons on screens. This latter method may be performed by picking the buttons from a list to be unavailable or available.

The administrator may specify if the user belongs to a specific media group or is in a global group. This option may control which assets, schedules and channels the user can see. Users can belong to the global media group and see everything, or they may be restricted to a specific media group.

The system log view 636, shown in FIG. 60, allows access to the detailed logs kept by the media distribution system. These can be used to investigate issues. Three different logging tabs are available for display. Technical logs (illustrated), divided into hours and days. The logs may be very large and comprehensive, identifying events by time, server, module, type, account, client, message, details, and duration. User logs (not illustrated) show all operations for a user account for a given day. Error logs show all errors that have occurred on a given day. Logs may be downloaded, emailed, or transferred as CSV files or other formats.

Any issue reports raised by the users are displayed on the issues tab on the logging screen. The super users can then review and investigate these, adding any additional comments before either closing an issue or submitting the issue to the manufacturer for further analysis. Any comments or changes in status of the issue are communicated back to original reporter via the messaging system.

As shown in FIG. 60, a missing material view 638 may be accessed to show any assets that are currently missing but required by schedules, regardless as to whether those schedules are loaded on a live channel or not. Selecting a specific missing item will list the schedules and channels that refer to it. The missing list is ordered by transmission time and, in the case of an asset being needed in multiple schedules at different times, the earliest time is used in the missing list.

The goal of asset management within the media distribution system is to automation by having the key asset data available within the platform, including, for example: in points, duration, media path, etc. Ingesting and import of media, plus any preparation required such as trimming, segmenting, quality control, normalization and transcoding is performed before the asset is registered with the media distribution system, except for media files containing Logo and Graphics assets, which can be delivered in industry-standard file formats including:

JPG Still Images
PNG Still Images
TARGA Sequences
PNG Image Sequences

Upon receipt of these files, the media distribution system will convert them to the required, internal graphics file formats.

Asset metadata can be created, read, updated and deleted via the media distribution system WebAPI. The system may monitor metadata of assets to handle when assets are renamed or deleted, the storage device storing the assets is offline, or other such situations. The system may perform synchronizations of filtered assets as necessary to populate cloud storage, local NAS storage, or offsite backup storage. In some embodiments, only metadata is replicated, and media is then accessed by the system through HTTP or similar file transfers.

The system also allows metadata changes via the user interface to be replicated back to asset management or ingest systems in a very timely manner, by synchronization of metadata databases. The system may include a delivery manager which may handle functions such as uploading or archiving of media files of an asset to cloud storage; and pulling or caching content at an automation system from the cloud storage. In some embodiments, the system may execute a cloud-based transcoding and/or streaming platform to allow streaming of stored media for view on a variety of client platforms, possibly at a reduced resolution for speed.

In some embodiments, when an asset is deleted from the media distribution system, only its metadata is deleted initially. If Media or Proxy Media has been replicated to the cloud system, (i.e. not stored externally), then this media may be deleted as well if there are no other assets referencing this media (co-references).

In addition to the REST interfaces that provide full access to the media distribution and management platform services, it is possible to supply schedules via the BXF interface. This can take the form of a BXF schedule uploaded from the client or directly via the BXF REST interface. Supported BXF events can include video clip and live primary events.

In some implementations, the application or user interface may include a live control screen, which may include a plurality of buttons for various functions or groups of functions. In some implementations, the user interface may be used by touch screen devices, such as tablet or portable computers, and accordingly, may comprise buttons large enough for easy selection by a user's finger. Buttons on the live control screen may send commands to an API to control one or more routers or switchers, such as a router on a media playout card as discussed above. The live control screen may allow transition between programs being broadcast according to an automation schedule and live or breaking news or other immediate sources. In some implementations, automation may continue to execute, such that the controller may return the channel to the normal automated stream when the breaking event is complete.

Figure 7:
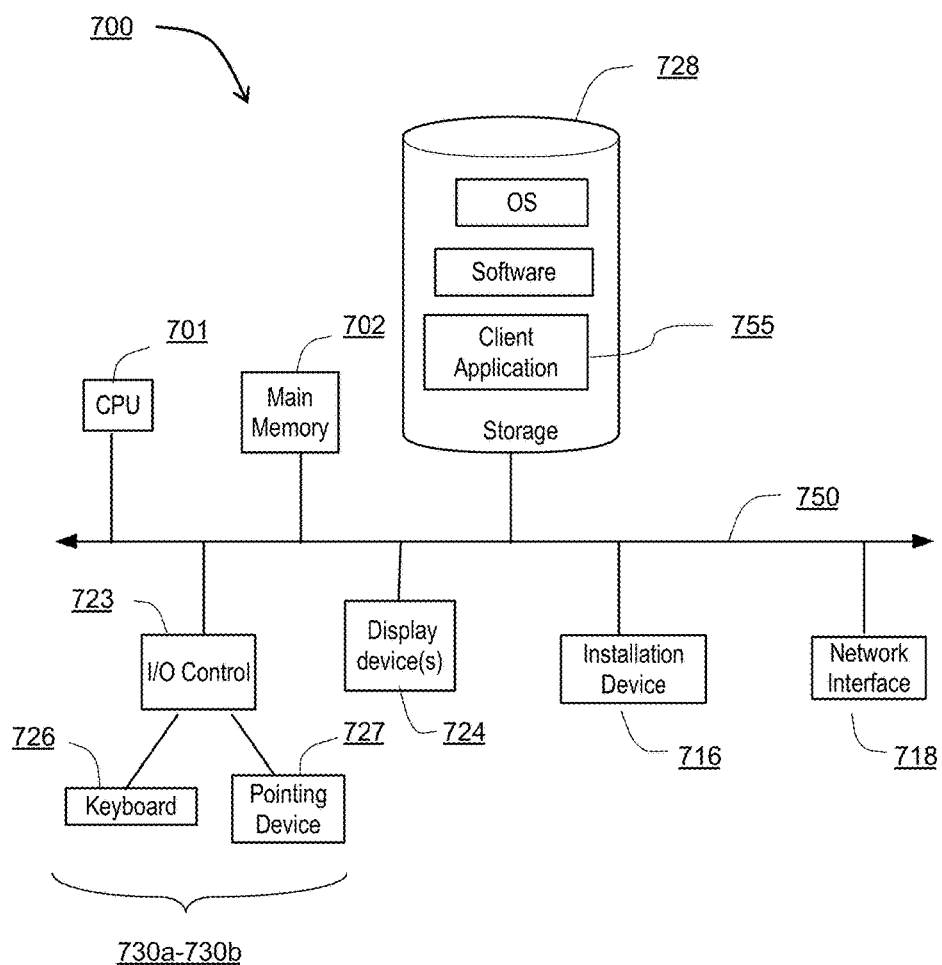
FIG. 7 is a block diagram of an exemplary computing device useful for practicing the methods and systems described herein.

As discussed above, various client devices may be used for accessing the user interface, ingesting media, or otherwise interacting with the system. FIG. 7 is a block diagram of an exemplary computing device useful for practicing the methods and systems described herein. The various devices 246, 248, 252 or other devices may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 7 depicts a block diagram of a computing device 700 useful for practicing an embodiment of the user devices 100 or device of an online storage or backup provider 114. A computing device 700 may include a central processing unit 701; a main memory unit 702; a visual display device 724; one or more input/output devices 730a-730b (generally referred to using reference numeral 730), such as a keyboard 726, which may be a virtual keyboard or a physical keyboard, and/or a pointing device 727, such as a mouse, touchpad, or capacitive or resistive single- or multi-touch input device; and a cache memory 740 in communication with the central processing unit 701.

The central processing unit 701 is any logic circuitry that responds to and processes instructions fetched from the main memory unit 702 and/or storage 728. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino California, or any other single- or multi-core processor, or any other processor capable of operating as described herein, or a combination of two or more single- or multi-core processors. Main memory unit 702 may be one or more memory chips capable of storing data and allowing any storage location to be directly accessed by the microprocessor 701, such as random access memory (RAM) of any type. In some embodiments, main memory unit 702 may include cache memory or other types of memory.

The computing device 700 may support any suitable installation device 716, such as a floppy disk drive, a CD-ROM drive, a CD-R/RW drive, a DVD-ROM drive, tape drives of various formats, USB/Flash devices, a hard-drive or any other device suitable for installing software and programs such as any client application 755, or portion thereof. The computing device 700 may further comprise a storage device 728, such as one or more hard disk drives or redundant arrays of independent disks, for storing an operating system and other related software, and for storing application software programs such as any program related to the client application 755. Client application 755 may comprise a web browser, application, or other interface for accessing a user interface provided by the media distribution and management system as discussed above. For example, as discussed above, in one implementation, client application 755 may comprise a standalone application for controlling play out servers, rather than a web browser. In many implementations, client application 755 may provide dedicated controls, keyboard shortcuts, or other interfaces for live control, including control via external hardware interfaces such as switch panels or triggers, console switch triggers, etc.

Furthermore, the computing device 700 may include a network interface 718 to interface to a Local Area Network (LAN), Wide Area Network (WAN) or the Internet through a variety of connections including, but not limited to, standard telephone lines, LAN or WAN links (e.g., Ethernet, T1, T3, 56kb, X.25), broadband connections (e.g., ISDN, Frame Relay, ATM), wireless connections, (802.11a/b/g/n/ac, BlueTooth), cellular connections, or some combination of any or all of the above. The network interface 718 may comprise a built-in network adapter, network interface card, PCMCIA network card, card bus network adapter, wireless network adapter, USB network adapter, cellular modem or any other device suitable for interfacing the computing device 700 to any type of network capable of communication and performing the operations described herein.

A wide variety of I/O devices 730a-730n may be present in the computing device 700. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 730 may be controlled by an I/O controller 723 as shown in FIG. 7. The I/O controller may control one or more I/O devices such as a keyboard 726 and a pointing device 727, e.g., a mouse, optical pen, or multi-touch screen. Furthermore, an I/O device may also provide storage 728 and/or an installation medium 716 for the computing device 700. The computing device 700 may provide USB connections to receive handheld USB storage devices such as the USB Flash Drive line of devices manufactured by Twintech Industry, Inc. of Los Alamitos, Calif.

The computing device 700 may comprise or be connected to multiple display devices 724a-724n, which each may be of the same or different type and/or form. As such, any of the I/O devices 730a-730n and/or the I/O controller 723 may comprise any type and/or form of suitable hardware, software embodied on a tangible medium, or combination of hardware and software to support, enable or provide for the connection and use of multiple display devices 724a-724n by the computing device 700. For example, the computing device 700 may include any type and/or form of video adapter, video card, driver, and/or library to interface, communicate, connect or otherwise use the display devices 724a-724n. A video adapter may comprise multiple connectors to interface to multiple display devices 724a-724n. The computing device 700 may include multiple video adapters, with each video adapter connected to one or more of the display devices 724a-724n. Any portion of the operating system of the computing device 700 may be configured for using multiple displays 724a-724n. Additionally, one or more of the display devices 724a-724n may be provided by one or more other computing devices, such as computing devices 700a and 700b connected to the computing device 700, for example, via a network. These embodiments may include any type of software embodied on a tangible medium designed and constructed to use another computer's display device as a second display device 724a for the computing device 700. One ordinarily skilled in the art will recognize and appreciate the various ways and embodiments that a computing device 700 may be configured to have multiple display devices 724a-724n. The various components may be connected via a local communication bus 750, which may comprise any type and form of intermodule or inter-component communication bus, including USB, PCIe, or any other such bus.

A computing device 700 of the sort depicted in FIG. 7 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 700 may have different processors, operating systems, and input devices consistent with the device. For example, in one embodiment, the computer 700 is an Apple iPhone or Motorola Droid smart phone, or an Apple iPad or Samsung Galaxy Tab tablet computer, incorporating multi-input touch screens. Moreover, the computing device 700 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. An automation fallback method, comprising:
receiving, by a network interface of a playout system from an automation server, a hierarchical automation schedule comprising a plurality of nodes distributed in a plurality of tiers, each node associated with at least one other node in a different tier in a parent-child relationship;
identifying, by a router of the playout system, a first item of content indicated for playback in a first node of the hierarchical automation schedule, the first node associated with a broadcast region served by the playout system;
determining, by the router, that the first item of content is not available for playback responsive to one of unsuccessful receipt of an input media stream comprising the first item of content or an absence of the first item of content in a storage device of the playout system;
iteratively searching each parent node of the first node in the hierarchical automation schedule, by the router, for a node including an identification of a second item of content, responsive to the determination that the first item of content is not available for playback;
determining, by the router, that the second item of content is available for playback responsive to one of successful receipt of a second input media stream comprising the second item of content or a presence of the second item of content in the storage device of the playout system; and
connecting a corresponding one of the second input media stream or a decoder decoding the second item of content to an output of the playout system, by the router, so as to output the second item of content.

2. A playout system for providing fallback recovery, comprising:
a network interface configured to receive a hierarchical automation schedule comprising a plurality of nodes distributed in a plurality of tiers, each node associated with at least one other node in a different tier in a parent-child relationship; and
a router configured to:
identify a first item of content indicated for playback in a first node of the hierarchical automation schedule, the first node associated with a broadcast region served by the playout system,
determine that the first item of content is not available for playback responsive to one of unsuccessful receipt of an input media stream comprising the first item of content or an absence of the first item of content in a storage device of the playout system,
iteratively search each parent node of the first node in the hierarchical automation schedule for a node including an identification of a second item of content, responsive to the determination that the first item of content is not available for playback,
determine that the second item of content is available for playback responsive to one of successful receipt of a second input media stream comprising the second item of content or a presence of the second item of content in the storage device of the playout system, and
connect a corresponding one of the second input media stream or a decoder decoding the second item of content to an output of the playout system, by the router, so as to output the second item of content.

3. An automation fallback method, comprising:
determining, by a playout system, that a first item of content is not available for playback, the first item of content identified in a first node of a hierarchical automation schedule comprising a plurality of nodes distributed in a plurality of tiers, each node associated with at least one other node in a different tier in a parent-child relationship, wherein the determination is based on one of unsuccessful receipt of an input media stream comprising the first item of content or an absence of the first item of content in a storage device of the playout system;
iteratively searching the hierarchical automation schedule, by the playout system, for a parent node of the first node including an identification of a second item of content, responsive to the determination that the first item of content is not available for playback; and
playing the second item of content, by the playout system, responsive to locating the parent node.

4. The method of claim 3, wherein playing the second item of content further comprises connecting a decoder to an output of the playout system, by a router of the playout system.

5. The method of claim 4, further comprising:
receiving an input media stream comprising the second item of content, by a network interface of the playout system; and
decoding the input media stream, by the decoder.

6. The method of claim 4, further comprising:
retrieving the second item of content from a storage device of the playout system; and
decoding the second item of content, by the decoder.

7. The method of claim 3, further comprising receiving, by a network interface of a playout system from an automation server, the hierarchical automation schedule.

8. The method of claim 7, wherein receiving the hierarchical automation schedule further comprises:
receiving, by the network interface of the playout system from the automation server, a first automation schedule comprising the identification of the first item of content in the first node, and a second automation schedule comprising the identification of the second item of content in a second node identified as a parent of the first node; and aggregating the first automation schedule and the second automation schedule to generate the hierarchical automation schedule, by the playout system.

9. The method of claim 3, further comprising:

identifying, by the playout system, the first item of content indicated for playback in the first node of the hierarchical automation schedule, the first node associated with a first broadcast region served by the playout system; and wherein the parent node is associated with a second broadcast region containing the first broadcast region as a subregion.

10. A playout system for providing fallback recovery, comprising:

a storage device storing a hierarchical automation schedule comprising an identification of a plurality of nodes distributed in a plurality of tiers, each node associated with at least one other node in a different tier in a parent-child relationship; and a router configured to:

determine that a first item of content is not available for playback, the first item of content identified in a first node of the hierarchical automation schedule, wherein the determination is based on one of unsuccessful receipt of an input media stream comprising the first item of content or an absence of the first item of content in a storage device of the playout system, iteratively search the hierarchical automation schedule for a parent node of the first node including an identification of a second item of content, responsive to the determination that the first item of content is not available for playback, and play the second item of content responsive to locating the parent node.

11. The system of claim 10, wherein the playout system further comprises a decoder and an output; and the router is further configured to connect the decoder to the output of the playout system.

12. The system of claim 11, wherein the playout system further comprises a network interface configured to receive an input media stream comprising the second item of content, by a network interface of the playout system; and wherein the decoder is further configured to decode the input media stream.

13. The system of claim 11, wherein the decoder is further configured to:

retrieve the second item of content from a storage device of the playout system; and decode the second item of content.

14. The system of claim 10, wherein the playout system further comprises a network interface configured to receive the hierarchical automation schedule from an automation server.

15. The system of claim 14, wherein the network interface is further configured to receive, from the automation server, a first automation schedule comprising the identification of the first item of content in the first node, and a second automation schedule comprising the identification of the second item of content in a second node identified as a parent of the first node; and wherein the playout system is configured to aggregate the first automation schedule and the second automation schedule to generate the hierarchical automation schedule.

16. The system of claim 10, wherein the router is further configured to identify the first item of content indicated for playback in the first node of the hierarchical automation schedule, the first node associated with a first broadcast region served by the playout system; and wherein the parent node is associated with a second broadcast region containing the first broadcast region as a subregion.

17. An automation fallback method, comprising:

determining, by a playout system, that a first item of content is not available for playback, the first item of content identified in a first node of a hierarchical automation schedule;

iteratively searching the hierarchical automation schedule, by the playout system, for a parent node of the first node including an identification of a second item of content, responsive to the determination that the first item of content is not available for playback; and playing the second item of content, by the playout system, responsive to locating the parent node.

18. The method of claim 17, wherein the hierarchical automation schedule comprises a plurality of nodes distributed in a plurality of tiers, each node associated with at least one other node in a different tier in a parent-child relationship.

19. The method of claim 17, wherein determining that the first item of content is not available for playback further comprises determining that the first item of content is not stored in a storage device of the playout system.

20. The method of claim 17, wherein determining that the first item of content is not available for playback further comprises determining that a media stream comprising the first item of content has not been received by the playout system.

21. The method of claim 17, wherein iteratively searching the hierarchical automation schedule further comprises identifying a lowest tier node within the hierarchy comprising the identification of the first item of content.

22. The method of claim 17, wherein iteratively searching the hierarchical automation schedule further comprises identifying a lowest tier node within the hierarchy corresponding to a broadcast region served by the playout system.

23. The method of claim 17, wherein playing the second item of content further comprises playing the second item of content from a storage device of the playout system.

24. The method of claim 17, wherein playing the second item of content further comprises retransmitting a media stream comprising the second item of content received by the playout system.

25. The method of claim 17, further comprising:

receiving, by the playout system, a first automation schedule comprising the identification of the first item of content in the first node, and a second automation schedule comprising the identification of the second item of content in a second node identified as a parent of the first node; and aggregating the first automation schedule and the second automation schedule, by the playout system.

26. The method of claim 25, wherein aggregating the first automation schedule and the second automation schedule comprises replacing an automation instruction of the second node with a corresponding automation instruction from the first node, responsive to the second node being identified as a parent of the first node.

27. A playout system for providing fallback recovery, comprising:
   a storage device storing a hierarchical automation schedule comprising an identification of a plurality of nodes distributed in a plurality of tiers, each node associated with at least one other node in a different tier in a parent-child relationship; and
   a router configured to:
      determine that a first item of content is not available for playback, the first item of content identified in a first node of the hierarchical automation schedule,
      iteratively search the hierarchical automation schedule for a parent node of the first node including an identification of a second item of content, responsive to the determination that the first item of content is not available for playback, and
      play the second item of content responsive to locating the parent node.

28. The playout system of claim 27, wherein the router is further configured to determine that the first item of content is not stored in the storage device of the playout system.

29. The playout system of claim 27, wherein the router is further configured to determine that a media stream comprising the first item of content has not been received by the playout system.

30. The playout system of claim 27, wherein the router is further configured to identify a lowest tier node within the hierarchy comprising the identification of the first item of content.

31. The playout system of claim 27, wherein the router is further configured to identify a lowest tier node within the hierarchy corresponding to a broadcast region served by the playout system.

32. The playout system of claim 27, wherein the router is further configured to play the second item of content by connecting a media decoder decoding the second item of content to a predetermined output of the playout system.

33. The playout system of claim 27, wherein the router is further configured to play the second item of content by connecting a network interface receiving a media stream comprising the second item of content to a predetermined output of the playout system.

34. The playout system of claim 27, wherein the storage device is configured to store a first automation schedule comprising the identification of the first item of content in the first node, and a second automation schedule comprising the identification of the second item of content in a second node identified as a parent of the first node.

35. The playout system of claim 34, wherein the router is further configured to aggregate the first automation schedule and the second automation schedule.

36. The playout system of claim 35, wherein the router is further configured to replace an automation instruction of the second node with a corresponding automation instruction from the first node, responsive to the second node being identified as a parent of the first node.

* * * * *